(12) United States Patent
Dodge et al.

(10) Patent No.: US 7,154,412 B2
(45) Date of Patent: Dec. 26, 2006

(54) HIGH-POWER WELL LOGGING METHOD AND APPARATUS

(75) Inventors: Carl Dodge, Houston, TX (US); George Goodman, Phoenixville, PA (US); Ray Davies, Houston, TX (US); Tom Standley, Coldspring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 480 days.

(21) Appl. No.: 10/403,865

(22) Filed: Mar. 31, 2003

(65) Prior Publication Data

US 2004/0189486 A1   Sep. 30, 2004

(51) Int. Cl.
*G01V 3/00* (2006.01)
*H04H 9/00* (2006.01)

(52) U.S. Cl. .............. 340/854.9; 340/853.1; 340/854.4; 340/854.5; 340/854.6; 340/854.7; 340/854.8; 340/855.7; 340/855.8; 340/855.9

(58) Field of Classification Search ........... 340/854.9, 340/855.8, 855.9, 588.7, 854.4, 853.1, 855.7; 367/83
See application file for complete search history.

(56) References Cited

U.S. PATENT DOCUMENTS

| | | | | |
|---|---|---|---|---|
| 3,459,956 A | * | 8/1969 | Brock ..................... | 307/22 |
| 3,603,923 A | * | 9/1971 | Nelligan ................. | 340/854.9 |
| 3,916,685 A | * | 11/1975 | Paap et al. ............... | 340/855.4 |
| 4,605,268 A | * | 8/1986 | Meador ................... | 439/194 |
| 4,720,996 A | * | 1/1988 | Marsden et al. ......... | 73/152.26 |

\* cited by examiner

*Primary Examiner*—Jeffery Hofsass
*Assistant Examiner*—Sisay Yacob
(74) *Attorney, Agent, or Firm*—Conley Rose, P.C.

(57) ABSTRACT

A power delivery system for a wireline tool includes two independent power transmission loops operating on a standard six-conductor cable. The two loops each connect directly to a respective terminals of a DC auxiliary power supply. Each loop also couples through a transformer to an AC instrument power supply. Another transformer for telemetry signals facilitates bidirectional communication between the downhole tool and an uphole computer.

36 Claims, 12 Drawing Sheets

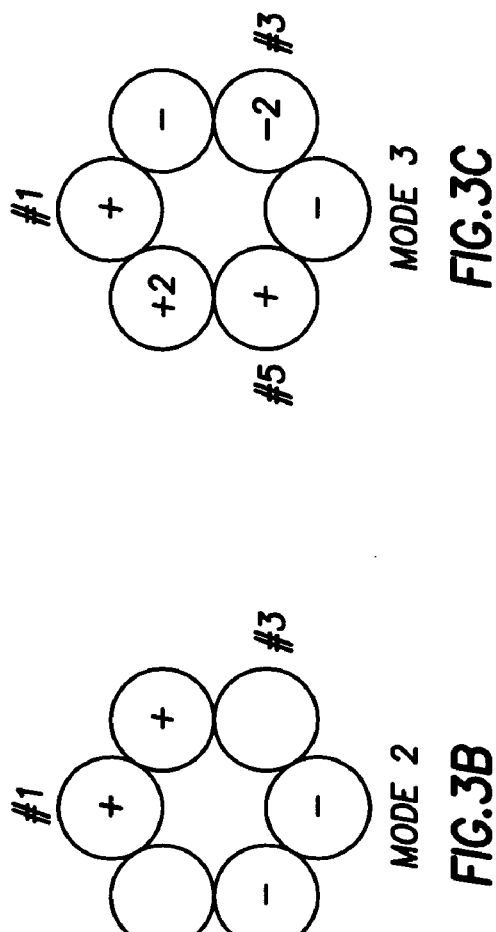
MODE 1 FIG.3A
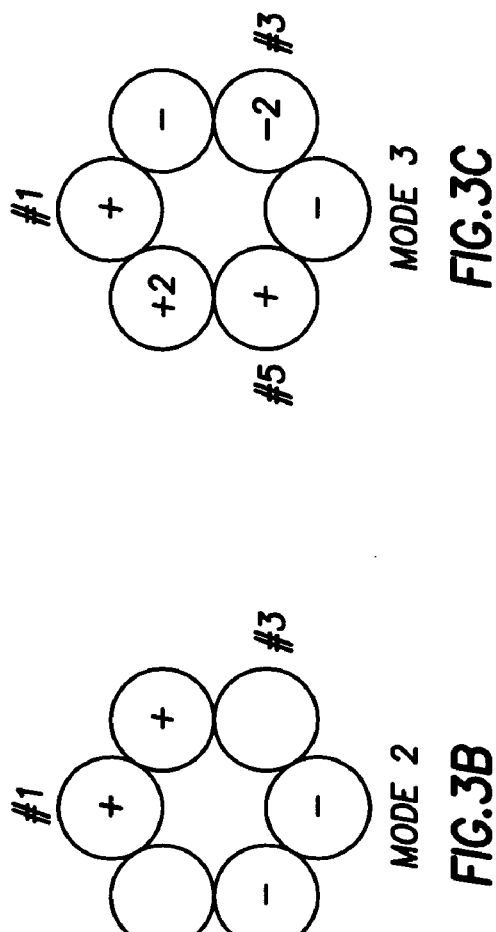
MODE 2 FIG.3B
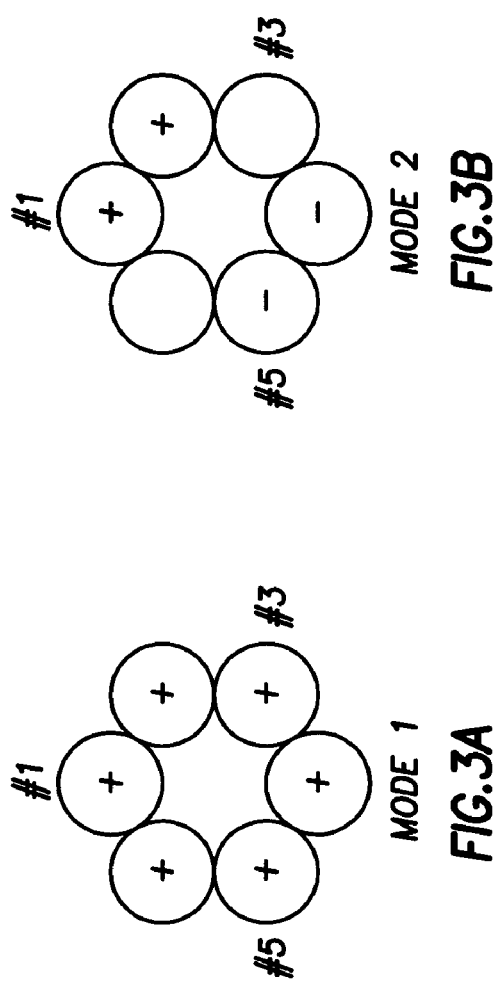
MODE 3 FIG.3C
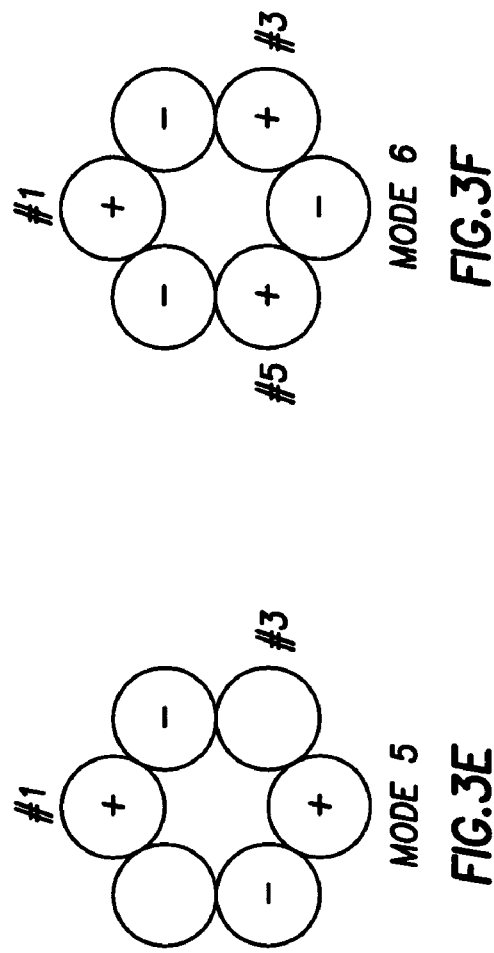
MODE 4 FIG.3D
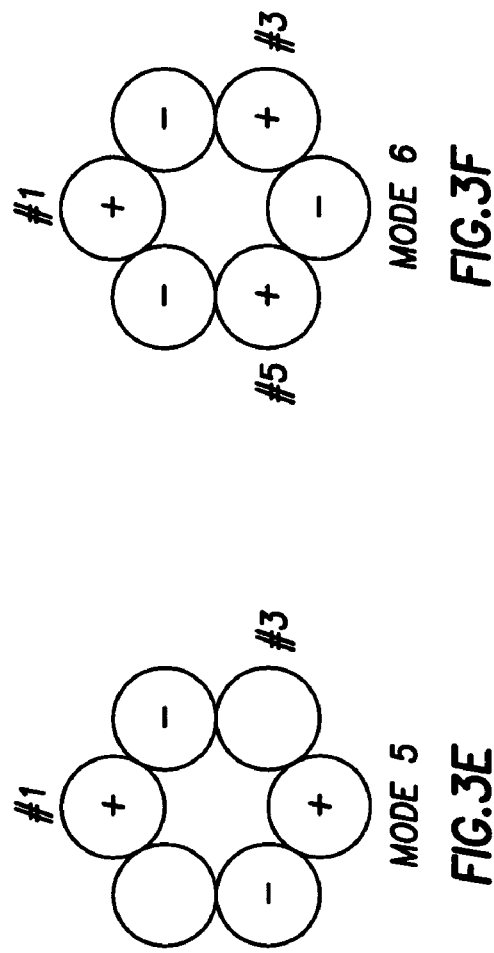
MODE 5 FIG.3E
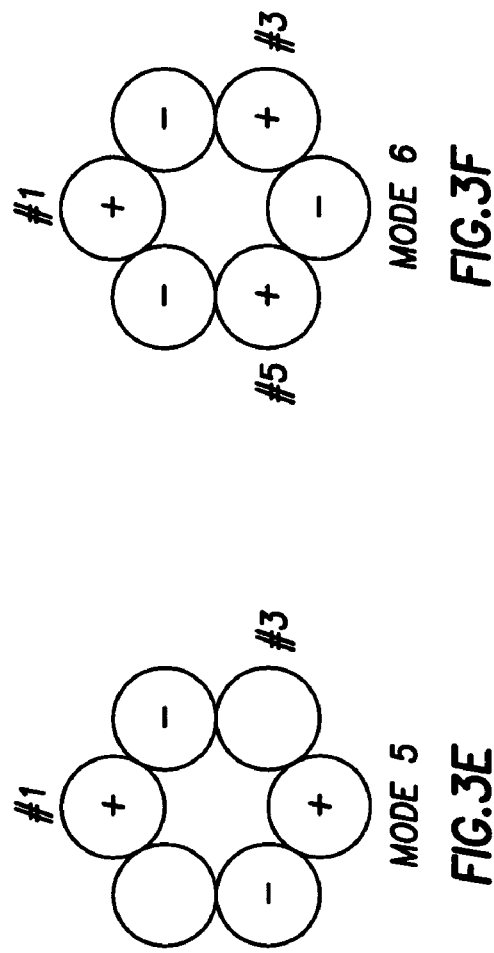
MODE 6 FIG.3F

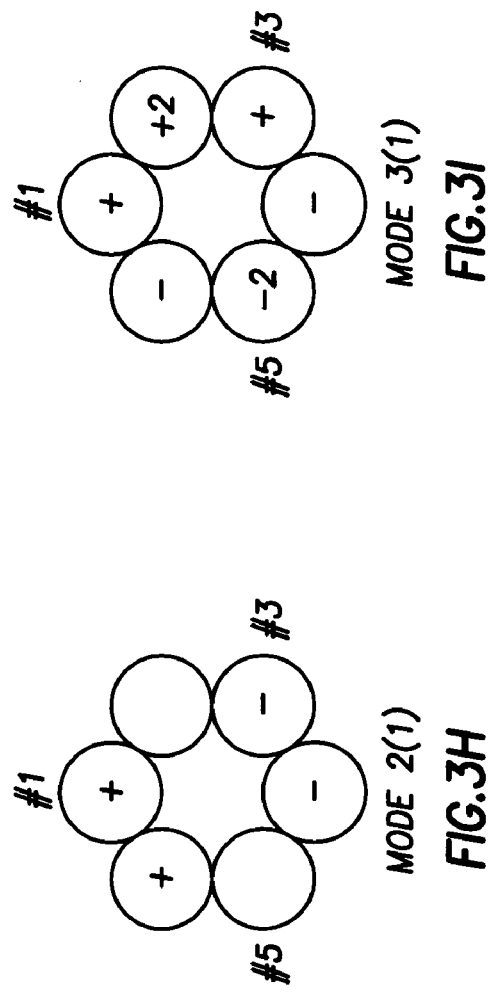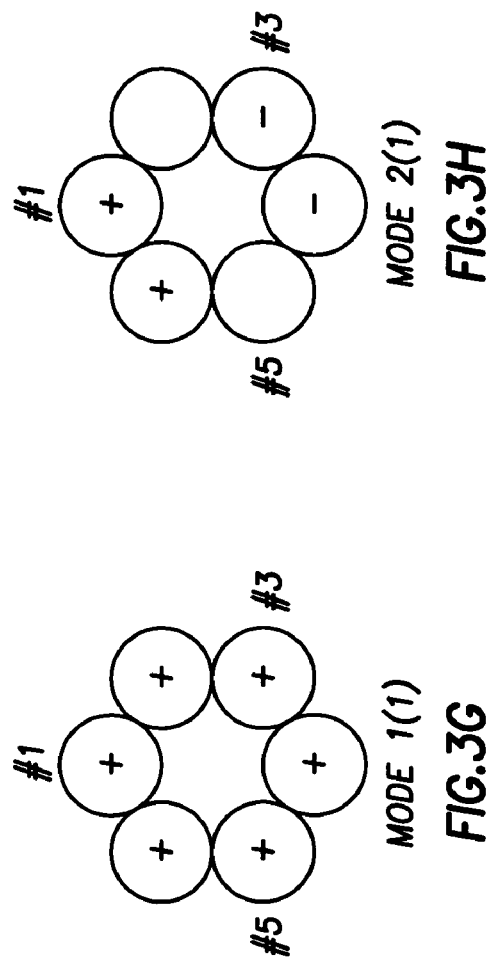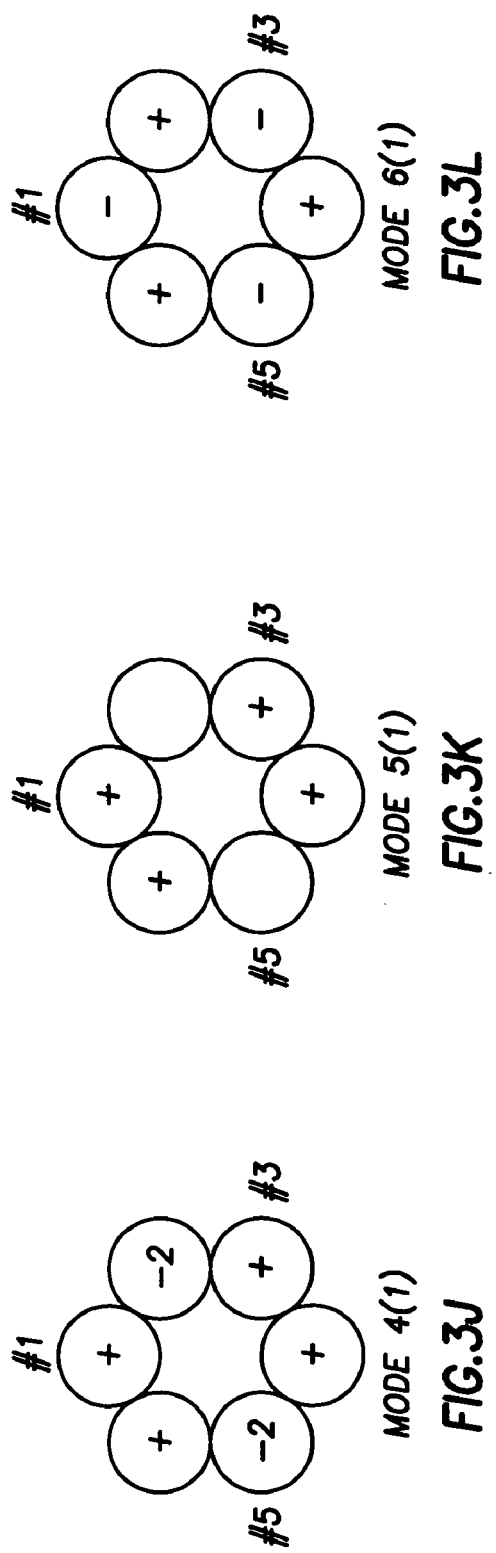

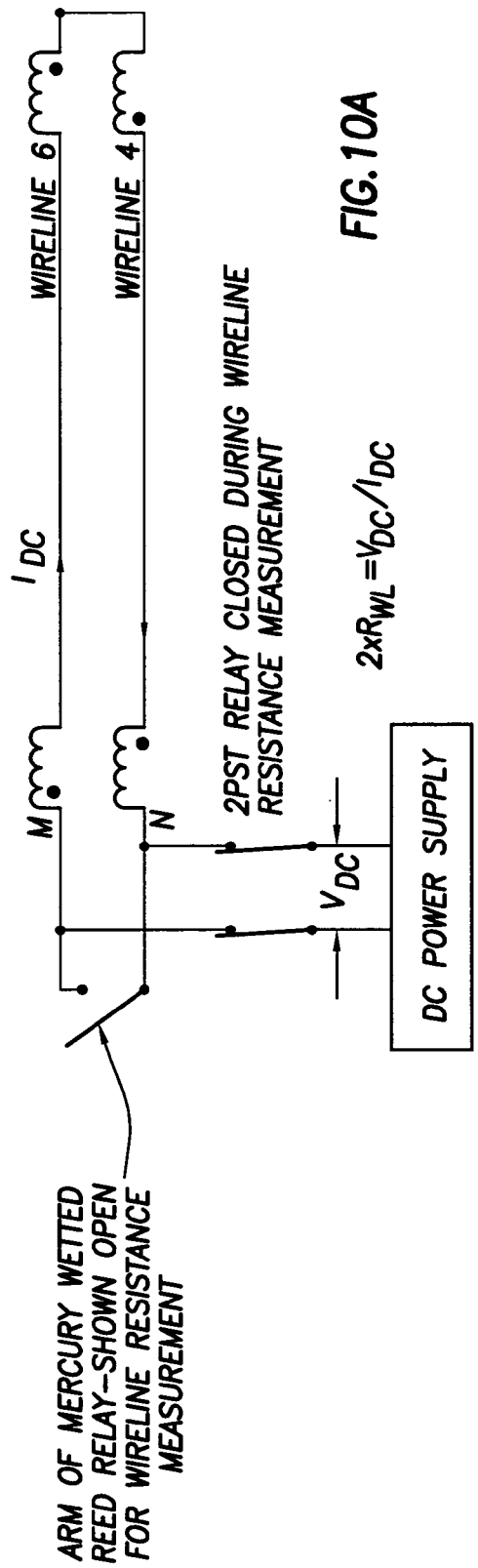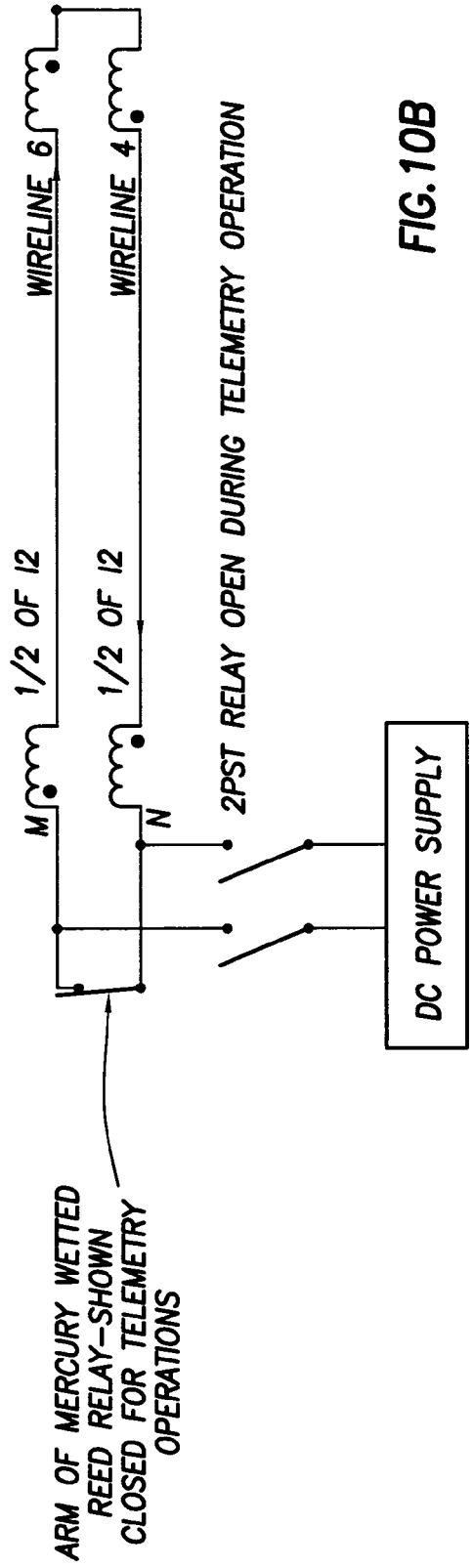

HIGH-POWER WELL LOGGING METHOD AND APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Field of the Invention

This invention relates to the field of well logging methods and apparatus for determining the characteristics of the earth formations surrounding a bore hole, and more particularly, to a wireline logging cable for safely providing large amounts of electrical power downhole to the well logging tool and for transmitting signals between the surface and the instruments in the well logging tool.

It is often necessary to survey or "log" the formations surrounding the borehole by passing a logging sonde or well logging tool through the borehole to measure the parameters or characteristics of the formations at various depths within the borehole. The logging tool is passed through the borehole using a wireline cable which supplies electrical power to the logging tool and transmits telemetry signals between the surface and the logging tool. The logging tool collects data and other information as it passes through the borehole and transmits the data and information to the surface for further processing and analysis.

One popular standard multiconductor wireline cable comprises six insulated conductors wrapped around a seventh, central insulated conductor. This assembly is encased within two counter-wound layers of steel armor wires which protect the interior conductors and carry the weight of the cable and sonde. A typical series resistance for the insulated conductors is about 10 ohms per thousand feet, or about 300 ohms for a 30,000 foot cable. However, this resistance may be significantly increased due to the higher temperatures which exist in the borehole.

In an effort to minimize the power losses due to resistance in the insulated conductors, some high power systems combine four of the conductors in parallel to carry current downhole, and use the armor as a return path. Since the resistance of the armor is about a tenth that of the conductors, or about 30 ohms for a 30,000 foot cable, this results in an overall impedance of about 105 ohms. However, any logging cable power delivery system that uses armor as one of the conductors is inherently dangerous to operate because of the associated voltage drop along the cable armor (130 volts is not uncommon). Intermittent contact with the casing downhole or parts of the oil rig structure at the surface may cause arcing since the casing and oil rig structure are at a different electrical potential than the cable armor. Further, people coming into electrical contact with different points on the cable armor (perhaps via a truck body or the oil rig) may be subject to an electrical shock because of armor voltage drop. Electrical currents as small as 15 mA through the human body are potentially dangerous.

U.S. Pat. No. 6,469,636 teaches a system that solves this problem by using only internal conductors to deliver power. If all currents are carried by the interior conductors of the cable, the risk of electrical shock to people coming into contact with the armor is substantially reduced because all conductors delivering power are encased inside 2 layers of steel armor wires. Its teachings are hereby incorporated by reference for all purposes. However, the power delivery system of this patent is not ideal in other respects. Even with the advances taught by this patent, there still exists a need for a less expensive, more compact, longer lasting, more reliable power delivery system for wire line logging.

SUMMARY OF THE INVENTION

The present invention is, in one embodiment, a power delivery system for a wireline tool. Such a power delivery system includes a power source, a first transmission loop to provide electrical power to the wireline tool, a second transmission loop to provide electrical power to the wireline tool, the first and second transmission loops being independent, and a power converter coupled to the first and second transmission loops to provide power to the wireline tool.

Another embodiment of the invention is a communication system that includes a telemetry transformer, the telemetry transformer including numerous windings that are connected in series without an intervening winding that is magnetically connected to a power supply. This allows an absence of shorting capacitors to be used in the communication system.

Another embodiment of the invention is a method to deliver power downhole.

Another embodiment of the invention is a method to detect top of tool voltage for a wireline tool.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a detailed description of the preferred embodiment of the invention, reference will now be made to the accompanying drawings wherein:

FIG. 3A–3L show two schemes of symmetrical cable connections which are orthogonal;

FIGS. 10A and 10B are a first scheme for implementing detection of tool top voltage;

DETAILED DESCRIPTION OF THE PREFERRED EMBODIMENT

Figure 1:
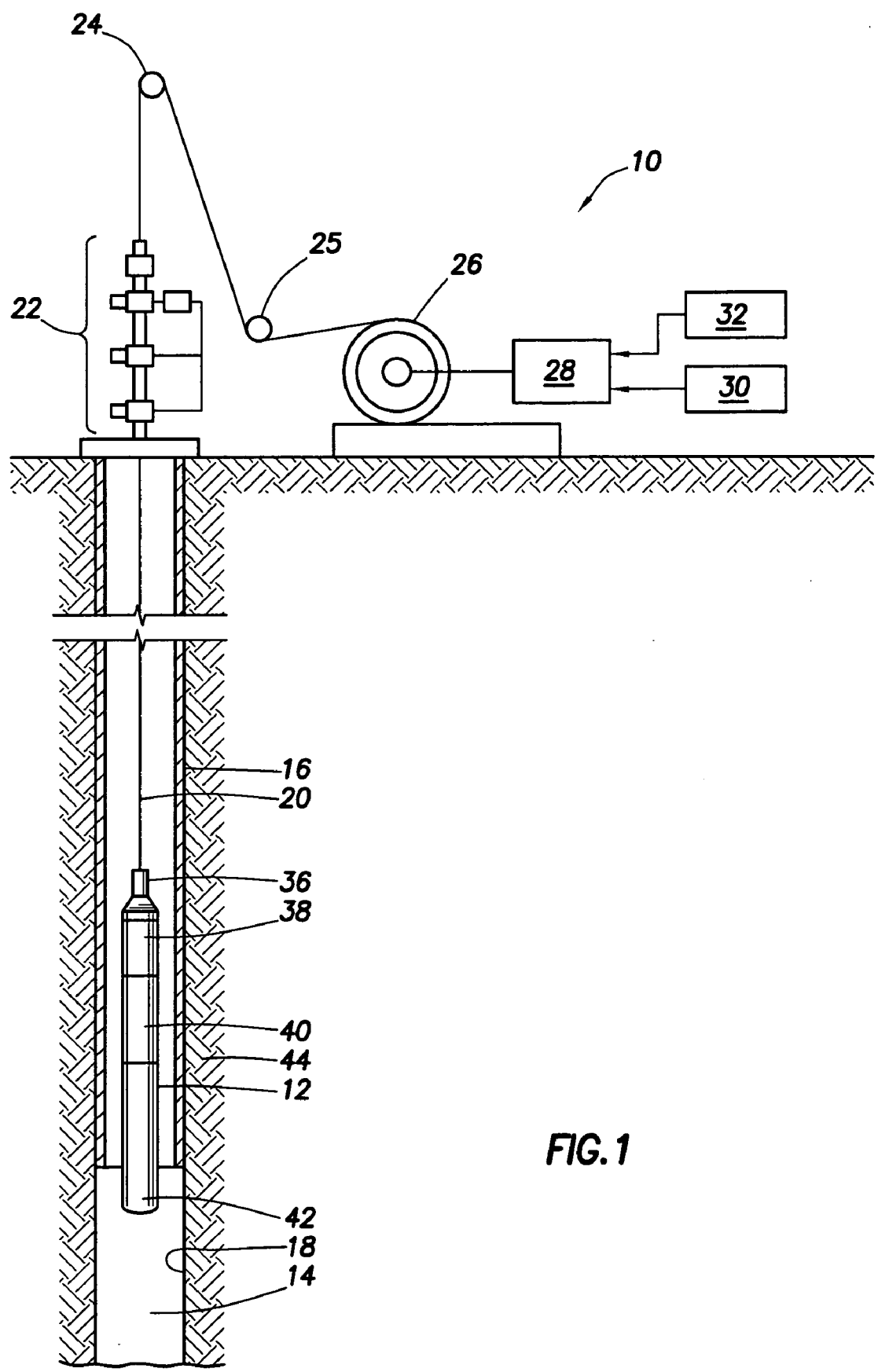
FIG. 1 is a block diagram of a well logging system using the present invention.

Referring to FIG. 1, the well logging system 10 for an embodiment of the present invention includes a well logging tool 12 to be lowered into a borehole 14 suspended on a cable 20. The borehole 14 may be cased with concentric casing 16 or be an open borehole such as at 18. The cable 20 extends from the tool 12 up through wellhead 22 and around a first sheave 24 and a second sheave 25 to a rotatable spool 26 for raising and lowering the cable 20 and tool 12.

The conductors in cable 20 are typically connected to a transceiver 28. In an exemplary embodiment, the conductors in cable 20 are each connected to a corresponding electrically conductive slip ring (not shown) on the spool axle. The conductive slip rings transfer electrical currents from the cable that rotates with the spool to corresponding electrically conductive brushes "riding" on the slip rings. The brushes are then coupled to the transceiver 28. In this manner, signals are transferred from the rotating spool to the stationary transceiver 28 with negligible degradation.

The transceiver 28 receives the logging data and information and in turn transmits the data and information to a computer or microprocessor 30. The computer 30 analyzes the logging data received from the downhole tool 12 and typically displays the logging information for the operator. The computer 30 may be further configured to provide control signals to transceiver 28 for communication to well logging tool 12. The cable 20 is also connected via transceiver 28 to a power supply 32 for supplying power to the logging tool 12. In a preferred embodiment, the power supply 32 is a programmable switching power supply capable of producing adjustable voltages and waveforms under the control of computer 30.

In well logging system 10, cable 20 is configured to safely deliver high electrical power and bidirectional telemetry to tool 12. The power is delivered in such a way that this system offers maximum safety to people operating the surface equipment, the logging cable, and the tools. Additionally, the risk of property loss (such as accidental damage or destruction of drilling equipment) due to electrical arcing is reduced in system 10 during logging operations.

The well logging tool 12 may be any one of various types used for recording downhole data. It should be appreciated that the present invention is not limited to a particular well logging tool. Typically, the well logging tool 12 includes a cable head 36 with the upper portion of the tool 12 including suitable electronic circuitry for controlling the supply of power and the transmission of the signals to and from tool 12. Typically tool 12 includes a motorized unit 40 and an instrument package 42 for collecting the data on the surrounding formation 44.

In typical operation, the well logging tool 12 is passed downwardly through the cased borehole 16 and into the open borehole 18 and then retrieved from the borehole 14 by spooling the cable 20 onto the reel 26. As the well logging tool 12 passes through the borehole 14, information is gathered and collected on the characteristics on the formation 44 surrounding the borehole 14. Reel 26 is normally provided with a rotational electrical connector having stationary brushes for connecting to transceiver 28.

Figure 2:
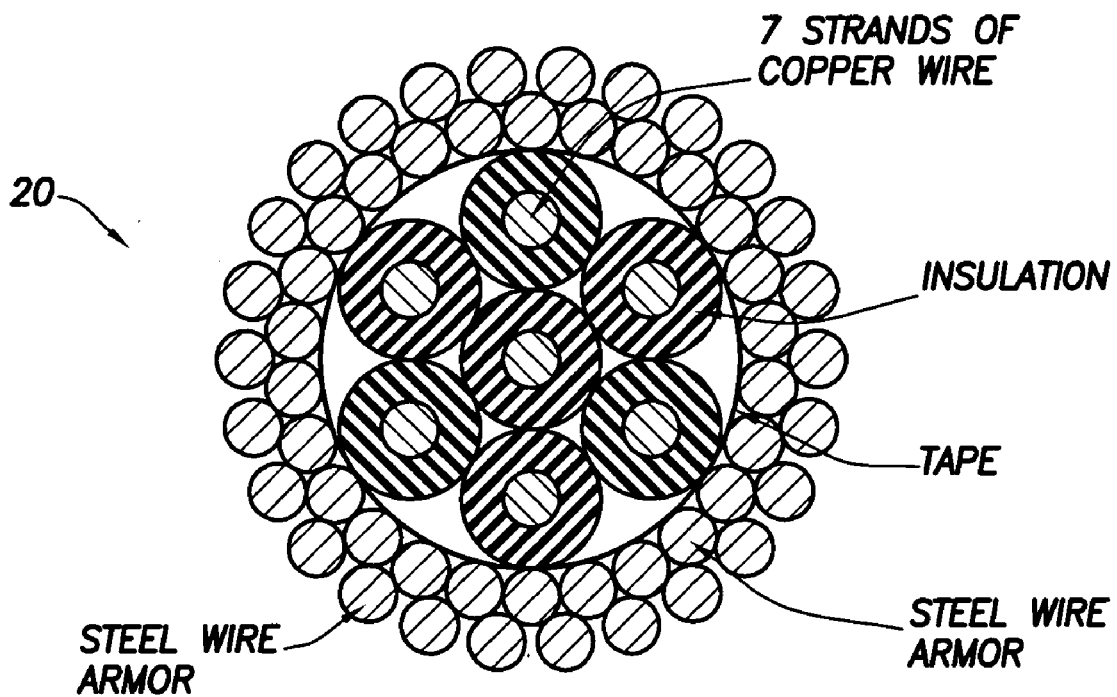
FIG. 2 is a cut-away view of a 7-conductor cable.

In a preferred embodiment, cable 20 is a seven-conductor logging cable as shown in FIG. 2. Such a cable, or its equivalent, is obtainable from various companies including Camesa Inc., Cablesa, and the Rochester Corp. Suitable examples include the Rochester 7H464 $^{15}\!/_{32}$" diameter cable or the Rochester 7H472 "SLAMMER" cable. Typical electrical characteristics of such cables are shown below.

| | |
|---|---|
| Electrical Insulation resistance | 1500 Megohm/Kft. |
| Rated insulation breakdown voltage | 1100 VDC (1200 VDC for 7H464) |
| Conductor series resistance | 10.5 ohms/Kft. maximum |
| Capacitance (any conductor to armor) | 40 to 50 pf/ft. (depends on temp. rating and the insulating material) |
| Capacitive and series electrical resistance | 4% maximum variation in outer 6 conductors balance between outer 6 conductors |

Referring to FIG. 2, the cables 20 typically comprise two layers of contra-helically wound steel armor encasing seven electrical conductors. Each conductor is comprised of copper wires surrounded by insulation. The geometry of the electrical conductors is six outer conductors wrapped around a seventh central conductor. The six outer conductors are equally spaced circumferentially. The seven conductors are wrapped with tape, around which resides the two layers of the steel wire armor. The steel armor is conductive (about 1 ohm/1000 ft) and can, if necessary, be used as an eighth electrical conductor (although this undermines the safety of the system). The steel armor is also ferromagnetic, and may be magnetically "marked" at regular intervals as a way of monitoring the downhole position of tool 12.

Other suitable examples of cable 20 include cables with stainless steel armor, MP35 armor, or other armors which have higher armor resistances. These cables may be preferred for corrosive drilling environments (e.g. high $H_2S$ and/or $CO_2$ concentrations).

Cable 20 is typically five or more miles in length, and the electrical conductors are subject to strong capacitive and inductive coupling between conductors and between each conductor and armor. As a consequence, signals sent downhole along any two arbitrary conductors are subject to distortion, and they produce significant "crosstalk" on the other conductors. One solution to this problem is to use separate cables for each signal, but this is expensive and not very reliable.

Another solution to this problem is to make use of the uniformity of the outer 6 conductors of the seven conductor cable. The cable includes six uniform outer conductors equally spaced from each other and equally distant from the center of the cable. By exciting symmetrically located conductors in this outer ring of six conductors with exactly chosen signal levels, the effects of inductive and capacitive coupling between conductors are overcome. The excitation (and detection) process can be described mathematically by a set of orthogonal eigenmodes and eigenvectors. Eigenmode theory can be used to predict the relative levels of excitation (or detection) that must be imposed on each conductor in order to excite or detect a particular one of the six modes. Each of the six columns shown in table 1 represents a particular eigenvector. The components of each vector are shown in the vertical column.

TABLE 1

| | Mode | | | | | |
|---|---|---|---|---|---|---|
| conductor # | M1 | M2 | M3 | M4 | M5 | M6 |
| 1 | +1 | +1 | +1 | +1 | +1 | +1 |
| 2 | +1 | +1 | −1 | +1 | −1 | −1 |
| 3 | +1 | 0 | −2 | −2 | 0 | +1 |

TABLE 1-continued

| conductor # | M1 | M2 | M3 | M4 | M5 | M6 |
|---|---|---|---|---|---|---|
| 4 | +1 | −1 | −1 | +1 | +1 | −1 |
| 5 | +1 | −1 | +1 | +1 | −1 | +1 |
| 6 | +1 | 0 | +2 | −2 | 0 | −1 |

Each of the columns is an eigenvector corresponding to a signal and/or power transmission mode. Each number in the column represents the component of the eigenvector corresponding to a particular cable conductor. A positive, negative, or zero voltage (or current) may be impressed on a conductor at any particular instant in time. The relative values of the components of each eigenvector indicate the ratios of voltages that must be impressed on (or currents that must be induced in) each conductor in order to excite the particular signal or power transmission mode described mathematically by that eigenvector. For example, the value in column M3 in row 4 represents the level of exitation (or detection) that must be applied to conductor #4 to excite (or detect) eigenmode 3. Example of symmetrical cable exitations that produce modes 1–6 are shown in FIGS. 3A–3F. To simply each Figure, only the six conductors are shown. Conductor #1 was chosen arbitrarily, with the subsequent conductors being numbered in a clock wise manner. The seventh conductor (7) may be used in conjunction with the cable armor (A) as an additional signal path. Although this is herein called a seventh mode (A7), this signal path is not orthogonal to (or independent of) mode M1, However, M1 has limited utility since it does not provide a complete transmission path. To transfer power from one end of the cable to the other, mode M1 must be used with another conductor not included in the set of the six outer conductors. The only possible other conductors in a 7-conductor logging cable are the central conductor and/or the armor.

Because of the physical symmetry of the group of conductors chosen to carry the currents of any particular mode, signals sent on one mode interfere only minimally with signals sent on any other mode. This signal independence is highly desirable. Due to the signal independence, 60 Hz and/or 200 Hz electrical power from the surface to downhole tools and bi-directional telemetry signals between the tools and the surface equipment can be simultaneously sent over the six outer conductors, and cause only minimal interference effects. Even huge transient surges in power due to motors turning on and off are rendered invisible to other modes which could be carrying sensitive telemetry information.

It is noted that the various modes have different frequency responses. Consequently, where high frequency transmissions are desired, certain modes may be more suitable for transporting high frequencies than other modes. Modes M4, M5, M6 and A7 are the highest bandwidth modes, and consequently may be chosen as the "best" modes for high frequency telemetry. M2 and M3 may be best used for low bandwidth signals.

The various modes also have different impedances. Since transmission loss is a consideration in power transmission, the differing impedances should play a role in determining mode assignments. The relative DC resistance of the six modes is illustrated in the table below. The calculations assume a cable length of 30,000 feet, with each cable conductor having a resistance of 10 ohm/Kft. Mode M1 is not capable of transmission by itself and must be used either with the central conductor or with armor. Plow steel is the material normally used to make the armor wires. The plow steel armor package typically has a resistance of about 1 ohm/Kft.

TABLE 2

| M1 vs. Armor (A) | 80 ohms |
|---|---|
| M1 vs. Conductor 7(7) | 350 ohms |
| M2 | 300 ohms |
| M3 | 225 ohms |
| M4 | 225 ohms |
| M5 | 300 ohms |
| M6 | 200 ohms |
| A7 | 330 ohms |

Besides bandwidth and impedance, other system considerations (e.g. safety, transformer design) may play a role in selecting mode assignments.

An alternate but equivalent method of arranging the eigenvectors on the six cables is according to the following table. These alternate eigenvectors have the same characteristics as modes M1–M6 listed above.

TABLE 3

| conductor # | M1(1) | M2(1) | M3(1) | M4(1) | M5(1) | M6(1) |
|---|---|---|---|---|---|---|
| 1 | +1 | +1 | +1 | +1 | −1 | −1 |
| 2 | +1 | 0 | +2 | −2 | 0 | +1 |
| 3 | +1 | −1 | +1 | +1 | +1 | −1 |
| 4 | +1 | −1 | −1 | +1 | −1 | +1 |
| 5 | +1 | 0 | −2 | −2 | 0 | −1 |
| 6 | +1 | +1 | −1 | +1 | +1 | +1 |

Referring to FIGS. 3G–3L, the easiest way to appreciate the differences in this arrangement from modes 1–6 is to note that these equivalent eigenvectors are derived by moving the conductor called #1 one position clockwise around the cable. The use of the alternate M1(1)–M6(1) eigenmodes for transmission is preferred because it is believed to improve safety by making a new system incompatible with existing systems.

The symmetrical voltages and currents imposed on the conductors in accordance with the eigenmode weights may be constant (DC) or varying (AC). In either case if the polarity of each conductor is reversed, the sygnal imposed on that mode remains orthogonal (independent) of all the other signals. Thus, for instance mode M6(1) is:

| 1 | −1 |
|---|---|
| 2 | +1 |
| 3 | −1 |
| 4 | +1 |
| 5 | −1 |
| 6 | +1 | which is exactly the same as mode M6(1A):

| 1 | −1 |
|---|---|
| 2 | +1 |
| 3 | −1 |
| 4 | +1 |
| 5 | −1 |
| 6 | +1 |

Mode M6(1) is shown pictorially to demonstrate the similarity to the previous set, but M6(1A) is actually implemented in the system to be described.

Eigenmode transmission in multiconductor cables is treated by David F. Strawe in the Boeing Co. report number D2-19734-1 "Analysis of Uniform Symmetric Transmission Lines" Jan. 27, 1971, and in Boeing Co. report number D2-26245-1 "Analysis of the controlled-Lay Cable" January 1973. Additional information can be found in "Multiconductor Transmission Line Analysis", by Sidnely Frankel, Artech House Inc., 1977, "Analysis of Multiconductor Transmission Lines (Wiley Series in Microwave and Optical Engineering), Clayton R. Paul, 1994, and in U.S. Pat. No. 3,603,923 dated Sep. 10, 1968 by Nulligan describing equipment using eigenmode transmission on a multiconductor cable. These references are hereby incorporated by reference.

In practice, it is desirable that identically generated voltages with single- or double-weights at the surface cause currents to flow through conductors that are as closely matched as possible. The degree to which voltage and current weightings are exactly attained will directly affect the independence of the modes from each other. Mode independence is desirable to minimize signal interference (crosstalk). In order to maintain the selected ratios of voltages (or currents) along the length of the cable, the cable must have conductors that are well balanced. Here, well balanced means that each cable conductor must have the same resistance per unit length, the same capacitance to armor per unit length, and must be made with uniform diameter and lay length over the length of the cable. In other words, the impedance and mutual coupling of the outer six conductors of the cable must be closely matched. Operational amplifiers, capacitors, or transformers are examples of devices which may be used to impress voltages (or currents) onto the various cable conductors to excite a given mode.

In conventional power delivery designs, only four conductors have been used to transmit two modes of power to tools downhole. For example, mode 2 (FIG. 3B) is employed to transmit auxiliary power downhole from the surface. To transmit instrument power downhole, mode 5 (FIG. 3E) is utilized. As a result, only four conductors are needed. This leaves conductors unused for power delivery when, as is frequently the case, seven conductors are available.

Figure 4:
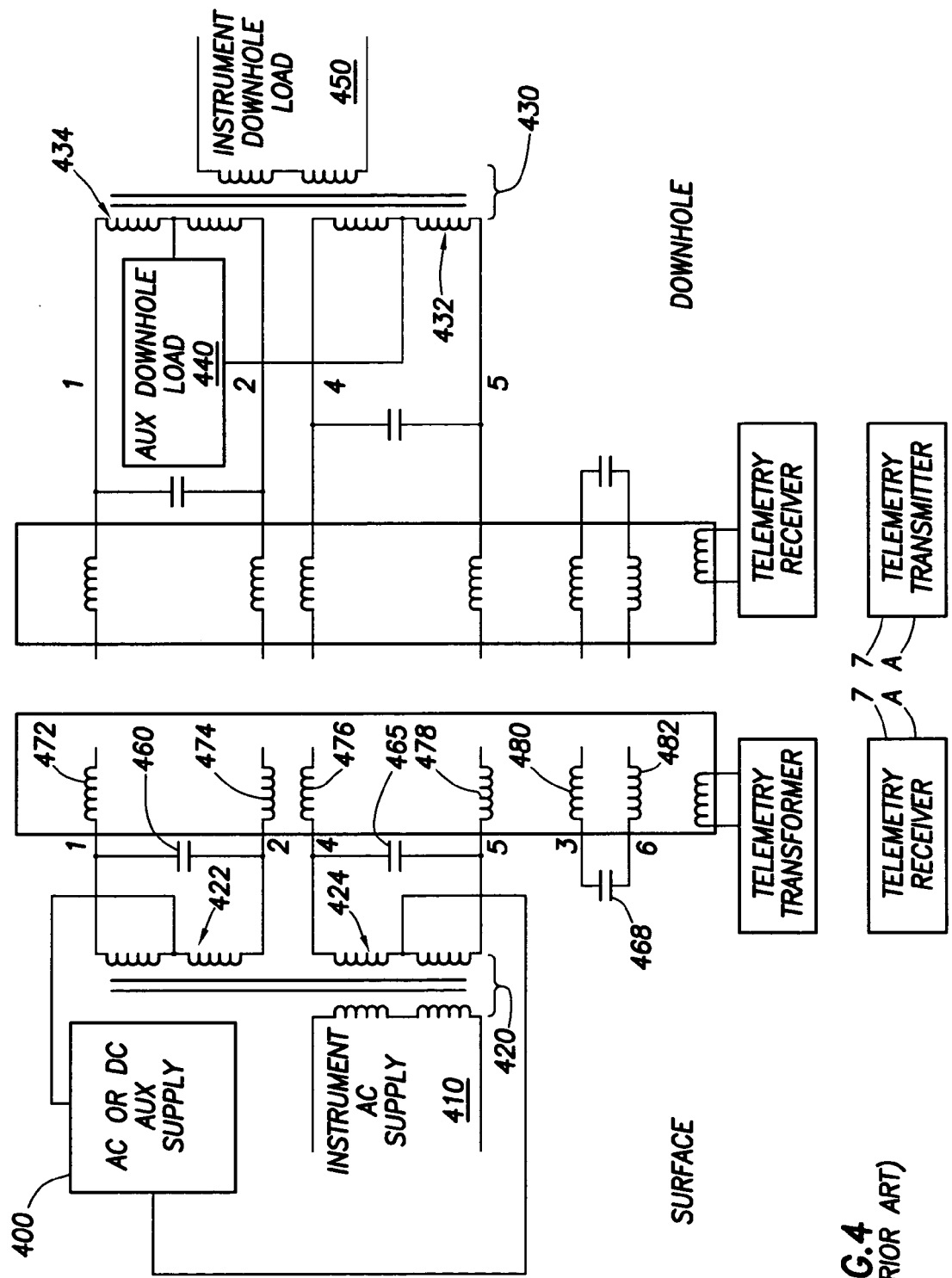
FIG. 4 is a prior art power delivery system.

A schematic diagram of a known wireline power delivery system is shown in FIG. 4. Included at the surface is AC or DC auxiliary power supply 400 that connects between winding 422 and 424 of transformer 420. Winding 422 of transformer 420 connects between conductors 1 and 2 (using the nomenclature of the cable conductors as described above), while winding 424 connects between conductors 4 and 5. Instrument AC supply 410 also forms part of transformer 420. As part of a telemetry connection, winding 472 connects to conductor 1, winding 474 connects to connection 2, winding 476 connects to winding 4, winding 478 connects to conductor 5, winding 480 connects to conductor 3, and winding 482 connects to conductor 6. At the surface, capacitor 460 connects between conductors 1 and 2 while capacitor 465 connects between conductors 4 and 5. Capacitor 468 connects between conductors 3 and 6. Capacitors 460, 465 and 468 are present to facilitate telemetry transmissions. At the high frequencies employed to transmit and receive telemetry signals, capacitors 460, 465 and 468 act as a short circuit. This allows current to flow between windings 472 and 474, winding 476 and 478, and windings 480 and 482 respectively, so that telemetry transmissions can be made. Without the shorting capacitors, winding 422 intervenes between windings 472 and 474. Similarly, without the shorting capacitors, winding 424 intervenes between windings 476 and 478. If not for the shorting capacitors, these intervening windings would interfere with the telemetry signals.

Capacitors C1, C2, and C3 downhole are needed to complete the telemetry current path for conductor pair 1 and 2, pair 4 and 5, and pair 3 and 6. Capacitors 460, 465, 468 (C1, C2, C3), while necessary for telemetry, are detrimental to power transmission. These 1 µfd capacitors represent $X_c = 1/(2\pi 60 \; 1\times 10^{-6}) \approx 2654 \; \Omega$ at 60 Hz. Thus for 200 VAC 60 Hz instrument power imposed between conductors 1 and 2 and between conductors 4 and 5, a reactive current of 200 v/2654 Ω=0.075 ma must be provided for each capacitor. Thus 30 watts reactive power must be supplied each cycle to the telemetry shorting capacitors. Downhole, each tool includes a power transformer such as that shown at 430 to strip off auxiliary and tool power. Telemetry signals are sent from downhole to the surface on 7 vs. Armor and received on telemetry transformer α from uphole at the surface. Conductors 1 and 2 connect to windings 432 and 434, while conductors 4 and 5 connect to winding 432. An Auxiliary downhole load 440 that requires a large amount of power, such as a motor or a set of large capacitors, connects to windings 432 and 434. Instrument downhole load 450 also forms part of transformer 430. After being rectified, this delivers 3.3, 5 and/or 15 Volts DC typically required by the downhole tools.

Figure 5A:
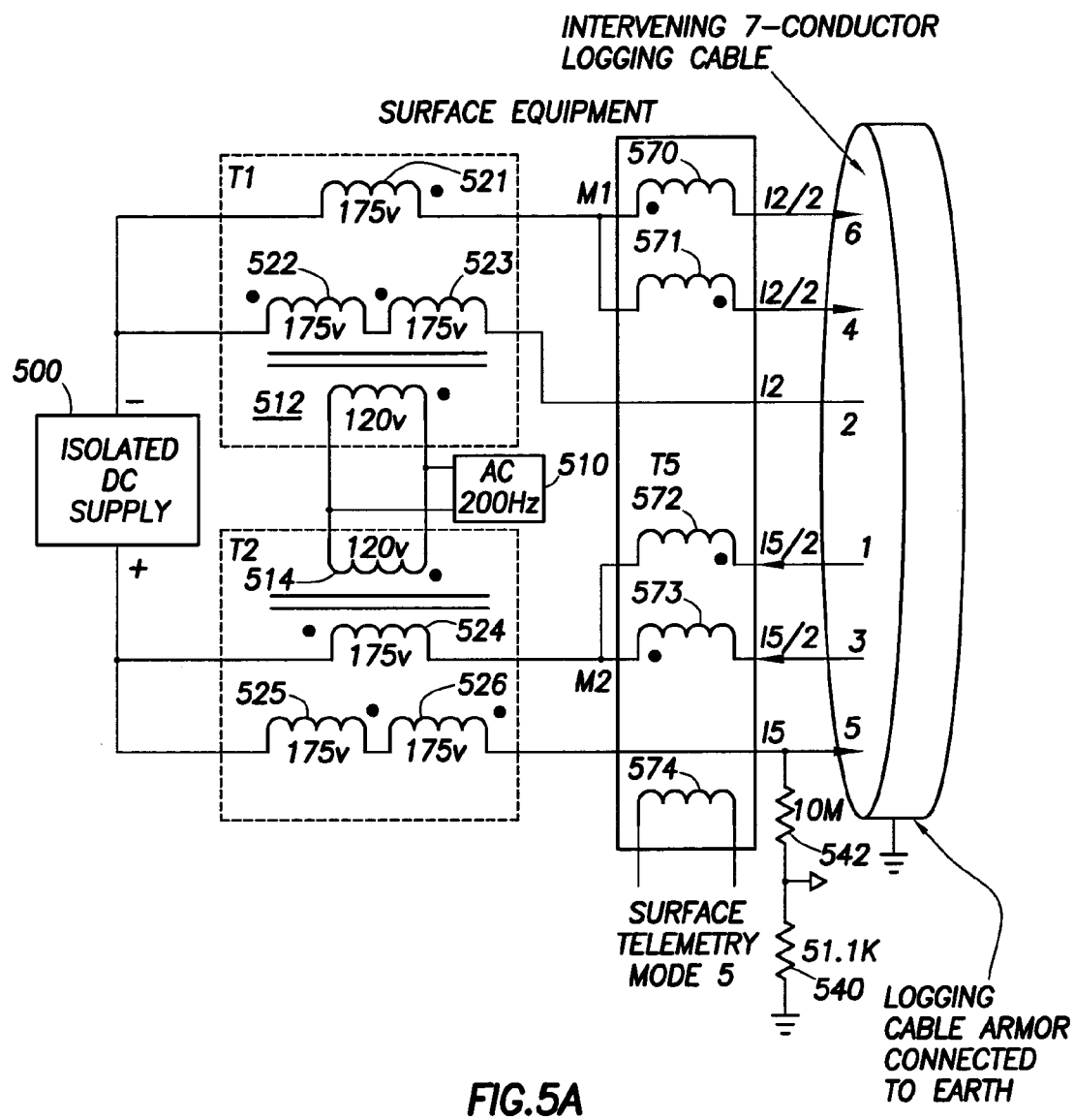
FIG. 5A is a schematic diagram of the surface components of an embodiment of the invention.
Figure 5B:
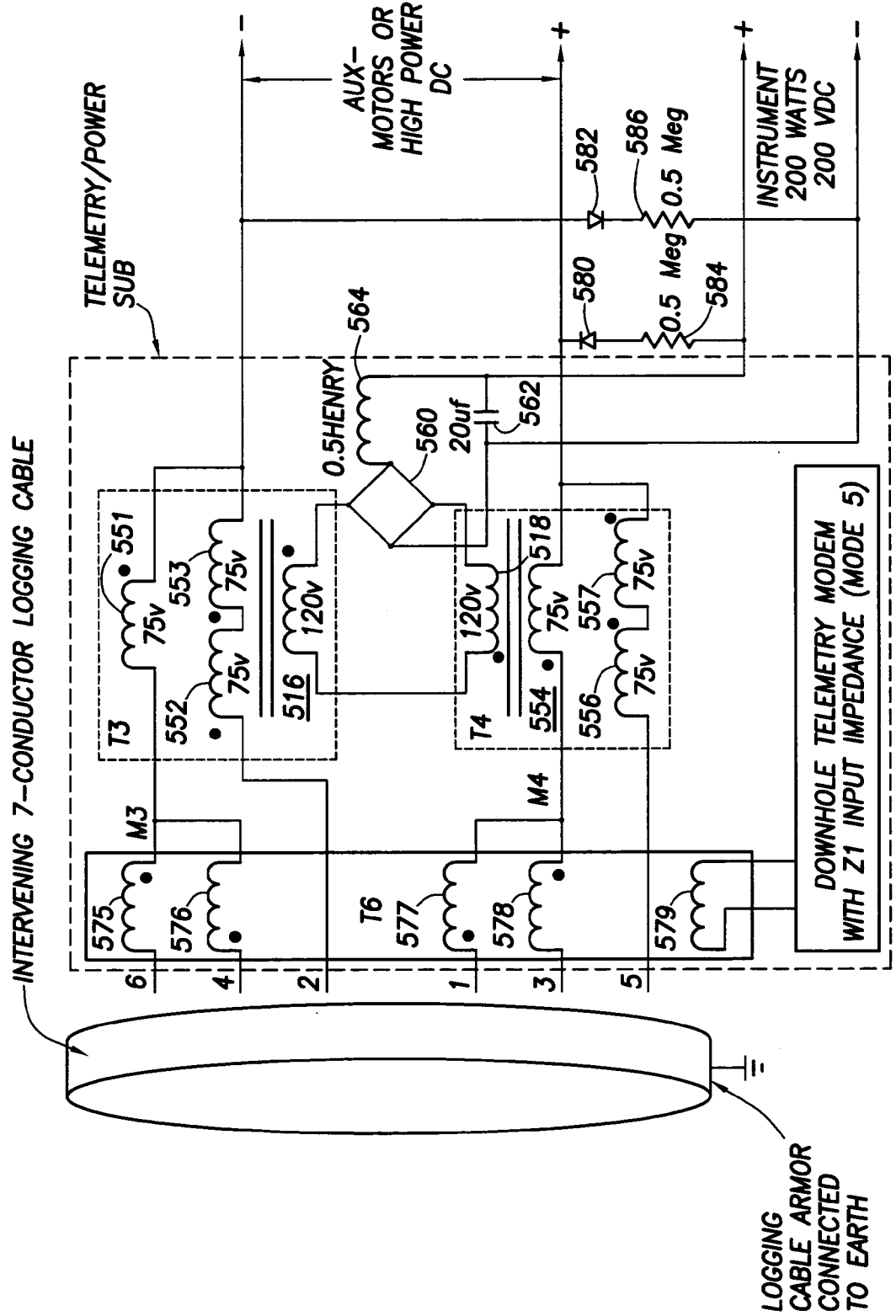
FIG. 5B is a schematic diagram of the downhole components for the embodiment of FIG. 5A.

A first embodiment of a two independent loop power delivery system is shown in FIGS. 5A and 5B. As used herein, regular use of the terms "primary" and "secondary" windings of a transformer will be made. Usually the terms connote the exciting and excited windings, respectively, but one of skill in the art will recognize that these functions are readily interchangeable, e.g. in the case of bidirectional communication. For the sake of clarity, the windings connected to cable conductors will be uniformly referred to as secondaries, even when they are performing the function of exciting other windings. Similarly, the windings not electrically connected to the cable conductors will be uniformly referred to as primaries.

FIG. 5A shows a schematic of surface components for this embodiment of the present invention connected to a 7 conductor logging cable. Terminals of floating isolated DC voltage supply 500 connect to respective terminals of transformers T1 (521, 522) and T2 (524, 525). Transformer T1 includes secondary 175 volt winding 521, and secondary 175 Volt windings 522 and 523 connected in series. Transformer T2 includes secondary 175 volt winding 524, and secondary 175 volt windings 525 and 526 connected in series. The primary windings 512, 514 of variable voltage AC supply 510 excite secondary windings in transformers T1 (521, 522, 523) and T2 (524, 525, 526). Transformer T1 connects through windings of surface telemetry transceiver T5 to conductors 4 and 6. Conductor 2 connects directly to the two windings of transformer T1 that are connected in series (522, 523). Transformer T2 connects through windings of surface telemetry transceiver T5 to conductors 1 and 3. Conductor 5 connects directly to the two windings of transformer T2 that are connected in series (525, 526). The series connection of windings provides double weights to the currents in conductors 2 and 5 as required for mode M3(1).

The two surface power transformers, T1 and T2, are identical in construction, with each wrapping around an iron core. The operating principle of transformer design is based on magnetic coupling of current-induced magnetic fields. To operate, transformers excite or detect currents in windings around the transformer core. For currents to flow (to allow transformers to operate) there must be a reasonably low-impedance current path at the frequency of interest. A special type of transformer, the multifilar transformer, has been found to be well suited to inducing and extracting signals of the exact weights selected. Multifilar transformers have identical windings, that is, each winding has the same characteristics, e.g. the same number of turns, the same capacitance with respect to adjacent windings, the same self inductance, the same mutual inductance with respect to adjacent windings, etc. Multifilar transformers with N identical secondary windings may be constructed by twisting N wires together, and then wrapping the twisted wire bundle together around the transformer core. To excite or receive a double voltage in a particular conductor (e.g. for conductors 2 and 5 in modes M3(1) and M4(1)), two of these identical windings may be connected in series. An additional beneficial consequence of multifilar transformer design results from capacitive coupling between wires in the twisted wire bundle. This capacitive coupling offsets the self-inductance of the windings, thereby extending the effective bandwidth of multifilar transformers. For small signals (e.g. communications and telemetry), the bandwidth typically extends into the megahertz range.

Surface telemetry transformer T5 includes four identical secondary windings 570, 571, 572, 573 and a primary winding 574. Secondary windings 570 and 571 connect to winding 521 on one side and cable conductors 6 and 4, respectively, on the other. Secondary windings 572 and 573 connect to winding 524 on one side and cable conductors 1 and 3, respectively, on the other. Each secondary winding 570–573 couples magnetically to primary winding 574. Primary winding 574 connects to the computer under whose control telemetry instructions are sent and information is received. As explained above, cable conductors 1–6 each form part of an intervening 7-conductor logging cable. The armor of the 7 conductor logging cable connects to ground.

A voltage divider consists of a 10 Megaohm resistor 542 in series with a 51.1 Kilohm resistor 540, which in turn connects to ground. Such a voltage divider or an equivalent attaches to each of the six wireline conductors at the surface, although only a single one of the dividers is shown.

FIG. 5B shows a schematic of downhole components for a telemetry/power sub. Generally, the equipment of FIG. 5B is enclosed in a tool mounted at the top of the tool string just beneath the cable head.

Referring to FIG. 5B, cable conductors 1–6 exit from the intervening 7-conductor logging cable. Conductors 4 and 6 connect to transformer T3 through windings of transformer T6. Conductors 1 and 3 connect to transformer T4, also through windings of transformer T6. Conductor 2 connects directly to transformer T3 and conductor 5 connects directly to transformer T4. Primary winding 516 of transformer T3 couples magnetically to secondary windings 551, 552, 553. Primary winding 518 of transformer T4 couples magnetically to secondary windings 554, 555, 556. Transformers T3 and T4 are identical in construction, and each wraps around a separate iron core.

Conductor 6 connects to secondary winding 551 of transformer T3 through secondary winding 575 of transformer T6. Cable conductor 4 connects to secondary winding 551 of transformer T3 through secondary winding 576 of transformer T6. Conductor 2 connects directly to secondary winding 552 of transformer T3. Conductor 1 connects to secondary winding 554 of transformer T4 through secondary winding 577 of transformer T6. Cable conductor 3 connects to secondary winding 554 of transformer T4 through secondary winding 578 of transformer T6. Conductor 5 connects directly to secondary winding 556 of transformer T4. Each of the secondary windings of the telemetry transformer T6 couples magnetically to primary winding 579. The downhole telemetry modem sends signals to the surface by imposing voltages in a certain frequency band on the primary winding. The same downhole modem receives signals from the surface in a different frequency band by detecting voltages on this primary.

Also shown is a bridge rectifier 560 attached between transformer windings 516 and 518. Bridge rectifier also attaches to 20 micro-Farad capacitor 562 and 0.5 Henry inductor 564. A first diode 580 connects to a first 0.5 Megaohm resistor 584 between winding 554 of transformer T4 on one side and one terminal of capacitor 562 on the other. A second diode 582 connects to a second 0.5 Megaohm resistor 586 between winding 553 of transformer T3 on one side and the other terminal of capacitor 562 on the other.

Auxillary power is available downhole between transformers T3 and T4, and specifically between the terminals of windings 551 and 553, and terminals of windings 554 and 557. Instrument power is available downhole between primary windings 542 of transformer T3 and 544 of transformer T4. Consequently, diodes 580, 582 and resistors 584, 586 connect the downhole auxiliary power lines to the downhole tool power lines.

Auxillary power is supplied via mode M6, or more preferably, mode M6(1A). Mode M6(1A) offers the lowest cable impedance of the modes that keep all the power conductors contained within the armor. In addition to reducing transmission losses, using the lowest available mode impedance minimizes the necessary surface voltage on individual conductors. This is significant because the rated insulation breakdown voltage of the cable becomes the limiting factor to supplying large powers safely to downhole tools. Since the maximum voltage which can be applied between outer conductors without exceeding the breakdown voltage of the insulation is double the maximum voltage which can be applied between the conductors and the armor, the cable can transport four times as much power, albeit with higher percentage losses. Nevertheless, the gain in transported power substantially exceeds the increased losses.

To activate mode M6(1A), conductors 1, 3, and 5 are placed at one polarity by power supply 500 while the three remaining conductors 2, 4, and 6 must be placed at the opposite polarity. The auxiliary power mode M6(1A) voltage generated by power supply 500 is applied by direct connection to conductors 1–6 as contrasted to coupling the power to the cable through a transformer connection. Since the coupling is done by direct connection as opposed to transformer coupling, the mode M6(1A) voltage may be either AC or DC, although it is preferably DC.

Since DC supply 500 is floating, the voltage supplied by floating isolated DC power supply 500 can be calculated according to:

Upper Loop $$V = (V_{WL6} + V_{WL4})/2 - V_{WL2} \tag{1}$$

$$I = I_2 \tag{2}$$

Lower Loop $$V = (V_{WL1} + V_{WL3})/2 - V_{WL5} \tag{3}$$

$$I = I_5 \tag{4}$$

Where,

V=Voltage;

$V_{WLN}$=Voltage at cable conductor (wireline) #N with respect to ground; and $I_x$=Current along cable conductor #X.

Advantageously, no mode M6 transformer is required at the surface or downhole to apply or extract the auxiliary power. This is beneficial since high power transformers tend to be bulky, and space is at a premium in downhole tools. Further, the system reliability is increased by the removal of unnecessary transformers. Any of four other independent modes (M2–M5) may be used to supply up to 240 watts of power per channel. Additionally, modes M2, M4, M5, M6 and A7 may be used to transport telemetry information.

The instrument and tool power is supplied to the primary winding of multifilar transformer T1 for transport downhole via mode M3. Mode M3 (and also mode M3(1)) offers the second lowest cable impedance of the modes that keep all the power conductors contained within the armor. Winding 512 places a potential via secondary windings 522 and 523 of transformer T1 on conductor 2 while placing a potential of half the magnitude and opposite potential on conductors 4 and 6 via winding 52. Winding 514 places a potential via secondary windings 525 and 526 of transformer T2 on conductor 5 while placing a potential of half the magnitude and opposite potential on conductors 1 and 3 via winding 524. This is the requirement to activate mode M3(1).

Instrument power is delivered from the surface to downhole via Mode M3(1) using two separate power current loops. In power loop 1, power currents flow one direction on wireline conductors #4 and #6 and the opposite direction on wireline conductor #2. The currents are forced to flow by the potential applied to this wireline conductor combination by transformer T1. Power is stripped off downhole using transformer T3.

Current I2 from the surface power transformer T1 secondary splits into equal parts and flows over conductors #4 and #6 to the downhole telemetry/power sub. In the downhole telemetry/power sub, the wireline currents in conductors #4 and #6 recombine and flow through the three series connected 75 volt secondary windings of transformer T3 (551, 552, 553). The current in the secondary windings of transformer T3 returns to the surface over logging cable conductor #2. Transformer T3 secondary winding currents produce current in the 120 volt winding of T3.

In power loop 2, power currents flow one direction on wireline conductors #1 and #3 and the opposite direction on wireline #5. Downhole transformer T4 strips power currents off the wireline. The currents are forced to flow by the potential applied by surface transformer T2.

Current I5 from the surface power transformer T2 primary windings 525, 526 flows over conductor #5 to the downhole telemetry/power sub. Current I5 flows through the three 75 volt windings (556, 557, 554) of transformer T4 downhole. This excites currents in the 120-volt winding 518 of T4. T4 primary current I5 splits and returns as equally distributed currents on conductors #1 and #3.

Transformer T5 and a matching transformer T6 downhole transmit and receive telemetry information via mode M5(1). Primary winding 574 of surface telemetry transformer T6 places a potential via secondary windings 570 and 573 of transformer T6 on conductors 6 and 3, respectively. Primary winding 574 places a potential of the opposite polarity by secondary windings 571 and 572 on conductors 4 and 1, respectively. This is the requirement to activate mode M5(1). Advantageously, by using separate frequency bands for uplink and downlink telemetry information, the connection between transformers T5 and T6 is bi-directional using a single mode.

Voltage dividers may be used to measure the voltage for each of the modes (corresponding to auxiliary power, tool power, and telemetry communication). It is to be understood that while a reading at the junction of the resistors 540 and 542 produces a scaled wireline measurement voltage proportional to the wireline voltage multiplied by 0.005, a 200-to-1 voltage divider is not necessary and other ratios may also be used. Further, although only a single voltage divider (consisting of resistors 540 and 542 connected to ground) is shown in FIG. 5A, an identical voltage divider preferably attaches to each of the cable conductors so that a voltage reading proportional to the instantaneous voltage on each cable conductor, can be made at each cable conductor.

Figure 6:
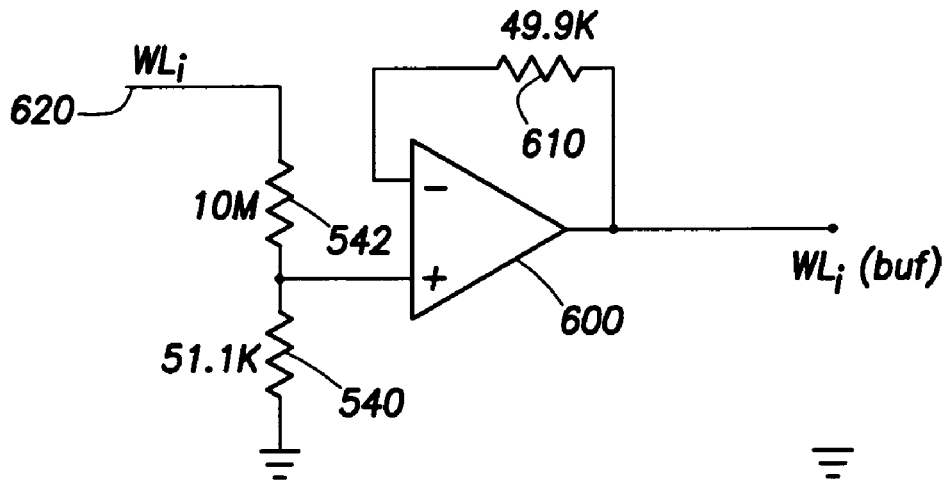
FIG. 6 is a schematic diagram of a voltage divider.

Referring to FIG. 6, a circuit to provide a voltage indicative of the voltage on a cable conductor is shown. The cable conductor of interest attaches to resistor 542 by line 620. Operational amplifier 600 connects through its positive terminal to the junction of the voltage divider, consisting of 10 Megohm resistor 542 and 51.1 Kilohm resistor 540. Resistor 540 connects to ground. A resistor 610 of 49.9 Kilohms connects between the negative terminal of op amp 600 and the output of op amp 600. The output of the op amp is indicative of the voltage applied by line 620 (i.e. the voltage of the respective conductor to which the voltage divider is attached).

Figure 7:
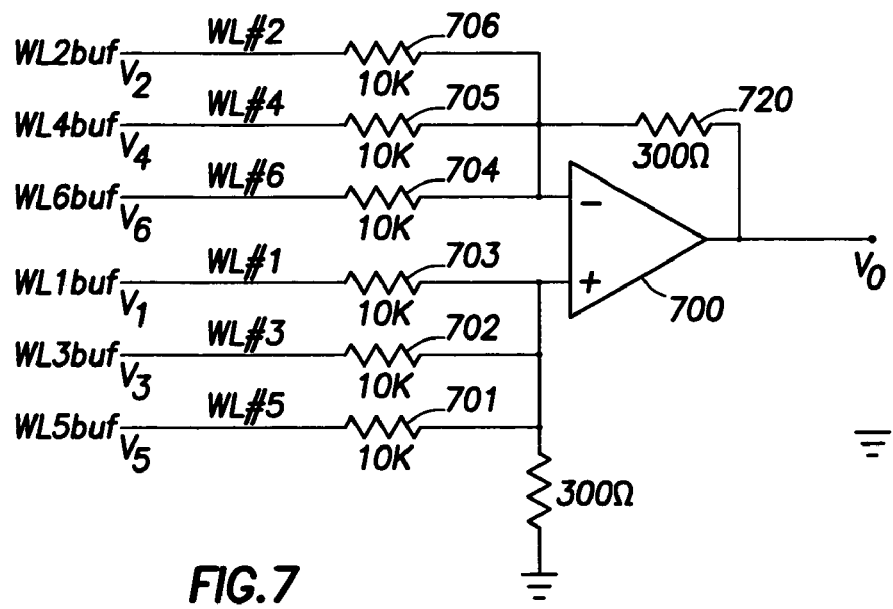
FIG. 7 is a schematic diagram of a circuit to detect auxiliary power.

Referring to FIG. 7, a circuit is shown to monitor the auxiliary power being transmitted on the cable conductors using mode M6(1A). Other equivalent circuits may also be used.

A wireline voltage corresponding to WL1/200 cable conductor 1 connects to a positive terminal of op amp 700 by intervening 10 kilohm resistor 703. A wireline voltage corresponding to cable conductor 3/200 connects to the positive terminal of op amp 700 by intervening 10 kilohm resistor 702. A wireline voltage corresponding to cable conductor 5/200 connects to the positive terminal of op amp 700 by intervening 10 kilohm resistor 701. Also attached to the positive terminal of op amp 700 is a 300 ohm resistor 707, which in turn connects to ground.

A wireline voltage corresponding to cable conductor 2/200 connects to a negative terminal of op amp 700 by intervening 10 kilohm resistor 706. A wireline voltage corresponding to cable conductor 4/200 connects to a negative terminal of op amp 700 by intervening 10 kilohm resistor 705. A wireline voltage corresponding to cable conductor 6/200 connects to a negative terminal of op amp 700 by intervening 10 kilohm resistor 704. Attached between the minus terminal of op amp 700 and the third terminal of the op-amp 700 is a 300 ohm resistor, 720.

As will be understood by one of ordinary skill in the art, the output of the circuit shown in FIG. 7, $V_0$, is:

$$V_0=[(V_1/200+V_3/200+V_5/200)-(V_2/200+V_4/200+V_6/200)]\times 0.03 \qquad (5)$$

Where, $V_N$=the voltage corresponding to cable conductor (wireline) number N.

As can be appreciated, instrument power and telemetry signals are also being transmitted along the six conductors. Because orthogonal modes are used, however, it can be seen that these signals cancel themselves out. For example, substituting in the mode M3(1) values for $V_1$, $V_3$, and $V_5$ and $V_2$, $V_4$, and $V_6$ results in $$[V_{INST}+V_{INST}+(-2V_{INST})]-[2V_{INST}+(V_{INST})+(-V_{INST})]\times 0.03 = 0 \quad (6)$$

Similarly, substituting in values according to mode M5(1) results in:

$$[V_{TEL}+(V_{TEL})+0]-[0+V_{TEL}+(-V_{TEL})]=0 \quad (7)$$

Thus, in detecting the auxiliary power voltage on transmitted mode M6(1A) the signals corresponding to modes M3(1) and M5(1) are not detected. It is advantageous to use orthogonal modes to transmit auxiliary power, instrument power, and telemetry signals on the power delivery system.

Figure 8:
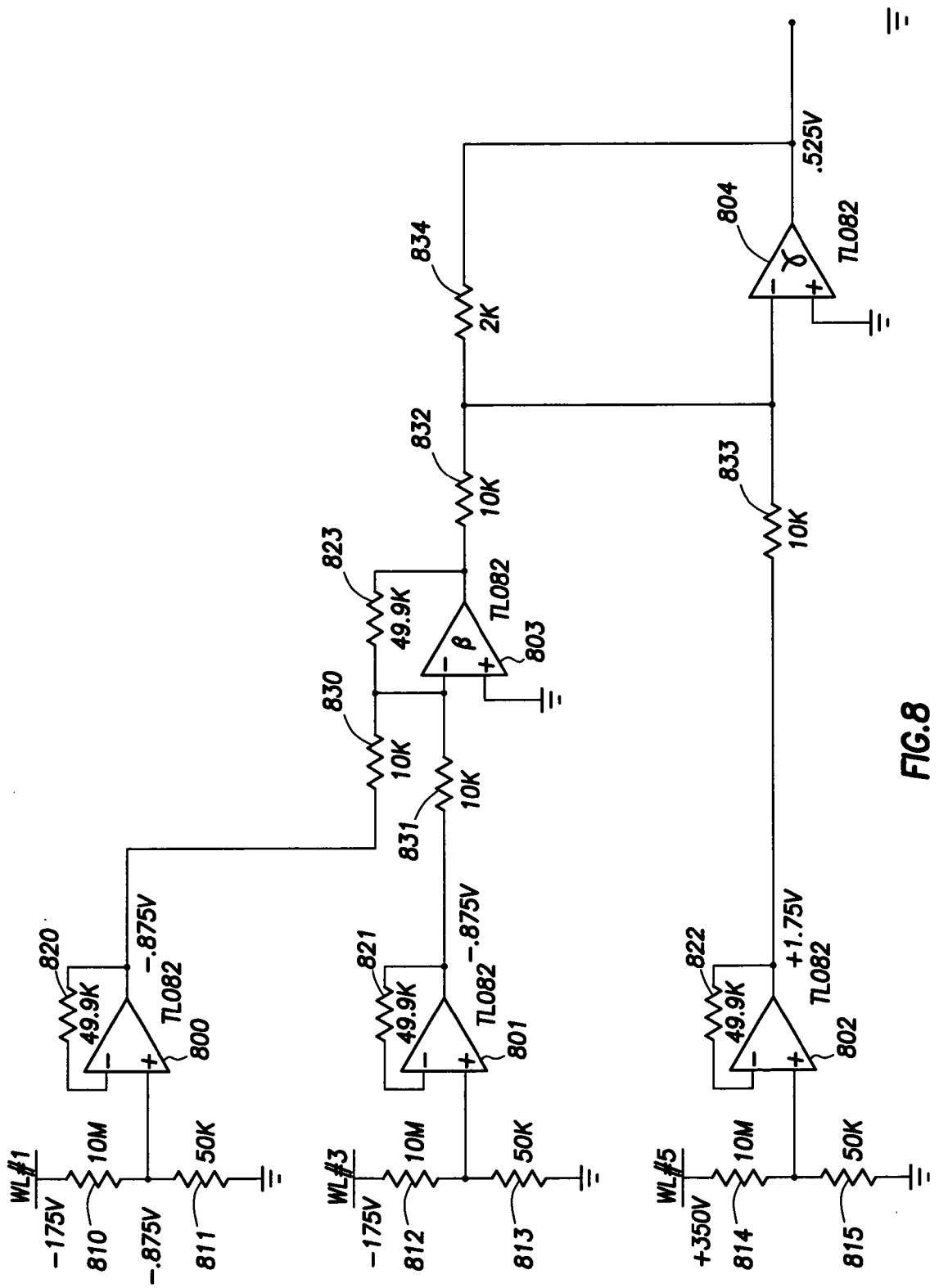
FIG. 8 is a schematic diagram of a circuit to detect the lower loop instrument power.

Similar circuits may be constructed by one of ordinary skill in the art to detect modes M3(1) (Instrument power) and M5(1) (telemetry signals). FIG. 8 shows a circuit to detect the instrument voltage signals transmitted in the lower loop according to mode 3(1). The voltage from wireline (cable conductor) #1 connects to a voltage divider consisting of resistors 810 and 811. A connection at the junction of 810 and 811 connects to the positive terminal of op amp 800. Resistor 820 of 49.9K connects between the negative terminal of op amp 800 and the output of op amp 800. The output of op amp 800 connects to 10K resistor 830. The voltage from wireline (cable conductor) #3 connects to a voltage divider consisting of resistors 812 and 813. A connection at the junction of 812 and 813 connects to the positive terminal of op amp 801. Resistor 821 of 49.9K connects between the negative terminal of op amp 801 and the output of op amp 801. The output of op amp 801 also connects to 10K resistor 831. The voltage from wireline (cable conductor) #5 connects to a voltage divider consisting of resistors 814 and 815. A connection at the junction of 814 and 815 connects to the positive terminal of op amp 802. Resistor 822 of 49.9K connects between the negative terminal of op amp 802 and the output of op amp 802. The output of op amp 802 also connects to 10K resistor 833.

The positive terminal of op amp 803 connects to ground. The negative terminal of op amp 803 connects to 10K resistors 830 and 831, as well as 49.9K resistor 823. Resistor 823 also connects to the output of op amp 803. Output of op amp 803 connects to 10K resistor 832. Thus, op amp 803 inverts and averages the sum of WL #1 and WL #3. Resistors 832, 833, and 834 connect to the negative terminal of op amp 804. Resistor 834 also connects to the output of op amp 804. For mode 6(1), used for the auxiliary power, WL #1, WL #3, and WL #5 are all voltage equal The output of op amp 803 for mode 6(1) is −WL #5. Op amp 804 then adds WL #5 and −WL#5 (from op amp 803) to result in cancellation of the auxiliary power voltage.

It is notable that the voltages on cable conductor (wireline) #1 and cable conductor (wireline) #2 are 180 degrees out of phase with cable conductor (wireline) #5 for mode M3(1).

Figure 9:
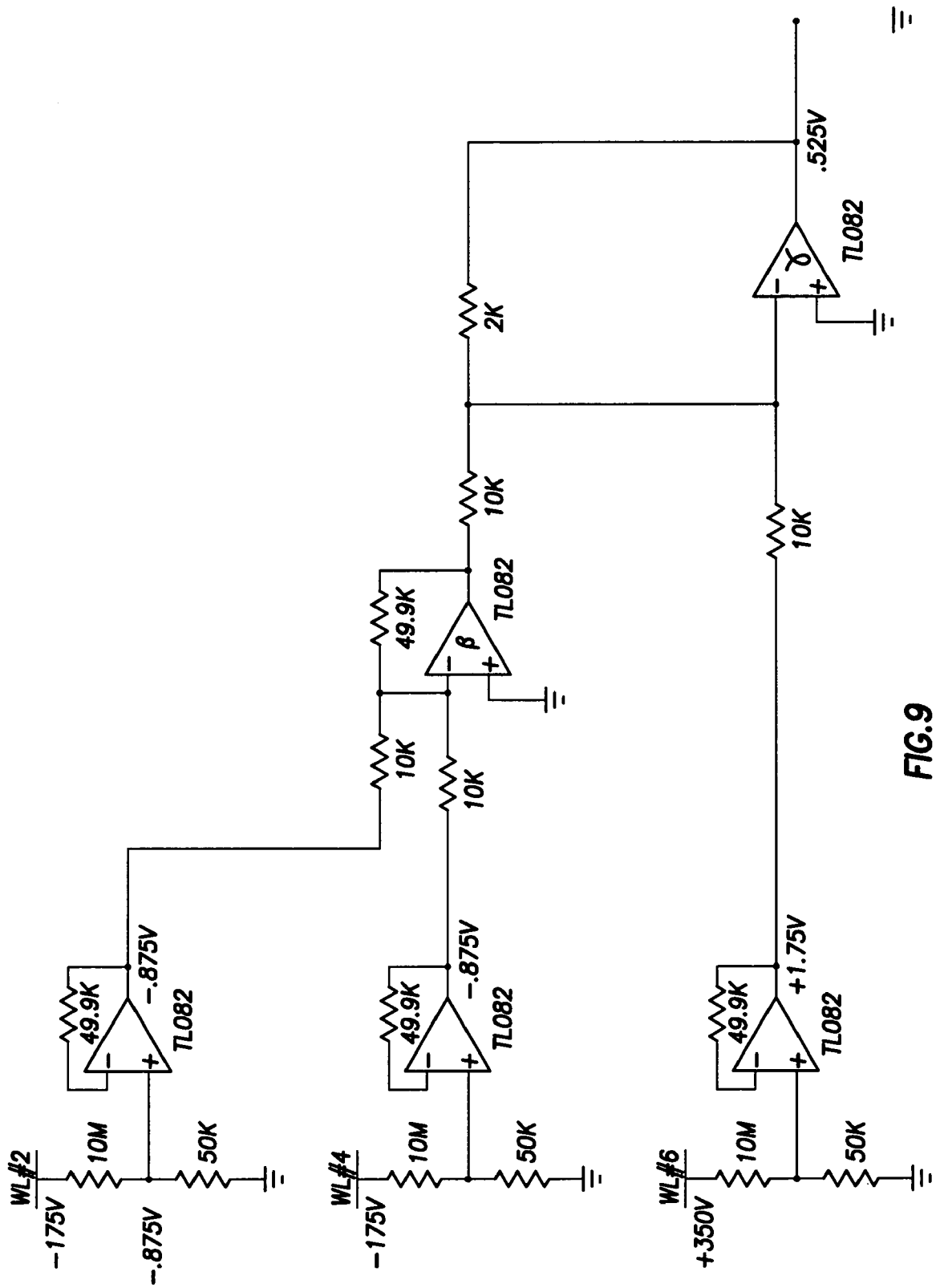
FIG. 9 is a schematic diagram of a circuit to detect the upper loop instrument power.

FIG. 9 shows a circuit to detect the instrument voltage signals transmitted in the lower loop according to mode M3(1). It is identical to the circuit shown in FIG. 8, except that the input cable conductors are # 2, # 4, and # 6.

An advantage to independent power loops is a diagnostic ability to continuously and reliably monitor electrical leakage along the cable. The pair of matched, but independent, power delivery loops means that an electrical leak in a single conductor anywhere along the cable will manifest in only one of the loops. Thus the leakage can be localized to one of 3 conductors. Suitable measures for correction could then be taken manually or by computer automation through computer 30.

Matched transformers T1 and T2 inserted in each loop at the surface couple equal amounts of power into two sets of wire-line conductors—#1, #3, and #5; and #2 , #4, and #6. A different set of matched transformers, T3 and T4 in the downhole tool, are used to strip power off the wireline. The proper operation of the power delivery system may be continuously monitored by comparing the surface voltage applied to each loop and the electrical current flowing in each loop. The electrical current flowing in each loop may be detected by the circuits of FIGS. 8 and 9. Alternate circuits may also be employed. A difference from the matched response of the two loops indicates a problem such as leakage from a conductor. This isolates the problem to one loop.

As can be appreciated, all electrical power currents are carried through six of the seven conductors, and no electrical power currents are carried on the cable armor. Therefore people handling the cable during (i) deployment of the tools and cable into the borehole, (ii) operation of the tools in the borehole, or (iii) extraction of the cable and tools from the borehole, are not exposed to currents intended to power the tools at the bottom end of the cable. Since all power currents are inside 2 layers of steel armor wire, there is minimal danger of electrical shock from these power currents to people who come in contact with the cable armor. This, in addition to the reliable electrical fault detector, greatly increases the safety of the system.

Additionally, pure sinusoids may leave too much time in which the maximum voltages are not being applied to drive power down the conductors. One way to increase the power throughput is to customize the waveforms to "flatten" and "fatten" the sinusoidal peaks, thereby increasing the amount of time during which a substantially maximum voltage is applied. Extreme modification may introduce too many harmonics which could interfere with telemetry on the same mode, so it is desirable to keep the harmonic content to a minimum.

Unlike previous power deliver systems, the telemetry signals are coupled to the wireline using a closed telemetry loop within each independent power loop. For example, referring again to FIG. 5A, no shorting capacitor exists between secondary windings 570 and 571, or 572 and 573. These closed telemetry loops remove the need for shorting capacitors. In other words, in the past, the cable conductors did not connect to form a closed electrical loop, except through shorting capacitors. The presence of shorting capacitors allowed transmission of telemetry signal currents at high frequencies to flow in the telemetry transformers. The use of the shorting capacitors attenuates the low frequency telemetry currents lowering the signal-to-noise ratio in this otherwise high signal-to-noise ratio range of frequencies. Signal attenuation increases with frequency for signal transmission over most transmission lines and for each of the six modes over the 7 conductor cable. However, in an ideal world, low frequency telemetry signals would be used because cable conductors present high impedances to signal transmissions at high frequencies. Thus, higher signal-to-noise ratios for telemetry communications are gained when the signals used for telemetry are low frequency. The electrical direct connection of the shorted telemetry loop shown in FIG. 5A offers significantly lower impedance to telemetry signals in the 4–20 kHz range compared to the bypass capacitors of previous systems. Additionally there is no need to supply reactive power to the telemetry shorting capacitors each ½ cycle. This reduces the load requirements placed on the power supply and allows more power on the conductors to be used for other purposes within the maximum allotted voltage for any conductor. Further, the use of lower frequencies (on the order of 500 Hz to 10 KHz, for example) also facilitates any frequency multiplexing of the upward and downward telemetry signals on a single mode. This reduces the number of components in the system and lowers the system cost.

Figure 12:
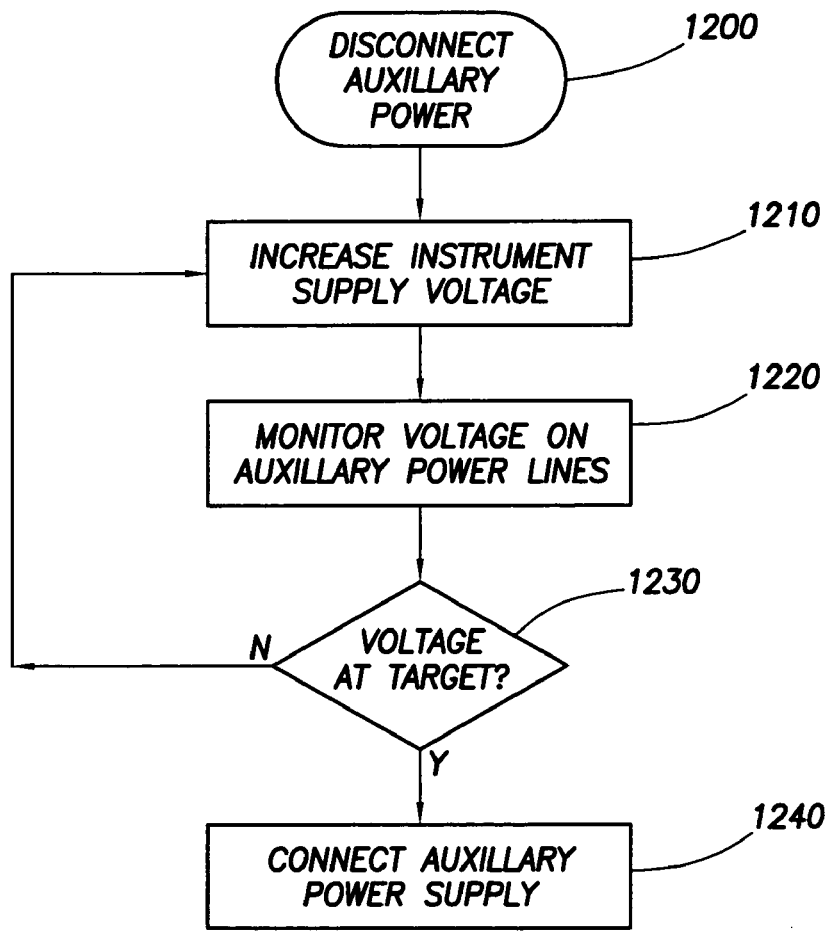
FIG. 12 is a flow chart of a method to determine tool top voltage.

Referring again to FIG. 5B, the preferred embodiment includes diodes 580, 582 and resistors 584, 586. This allows the system to determine the top of tool voltage, $T_{TOT}$. A determination of $T_{TOT}$ is helpful because the operator of the wireline tools has a dilemma. The measured voltage downhole is one of the measurements transmitted uphole with the telemetry signals during operation of the downhole tools. However, the downhole instruments do not typically operate until they receive at least 150 volts, and more properly about 200 volts. Furthermore, it takes about 30–45 seconds for the telemetry system to sync surface and downhole, train itself, and start transmitting data. Prior to transmission of instrument power downhole, the downhole instruments do not operate and so do not measure the downhole voltage. Thus, as instrument power is slowly applied, there is a need to know the downhole voltage but the downhole instruments are not operating. One aspect of the invention solves this problem by the coupling of the auxiliary and instrument power deliver lines by diodes 580, 582 and resistors 584, 586. Referring to FIG. 12, a method to determine top of tool voltage $T_{TOT}$ includes the following steps:

1. Keep auxiliary power off/disconnected—step 1200;
2. Slowly turn up instrument supply voltage at the surface—step 1210;
3. Monitor auxiliary surface voltage. However, because of the connection by diodes 580, 582 and resistors 584, 586 between the instrument and auxiliary power lines, the voltage being measured is the downhole instrument voltage—step 1220;
4. Upon reaching the desired downhole instrument voltage, e.g. 200V, the instrument power applied at the surface may be stabilized—step 1230;
5. Auxiliary power may be turned on and instrument power readings transmitted with the telemetry signals—step 1240.

Figure 11:
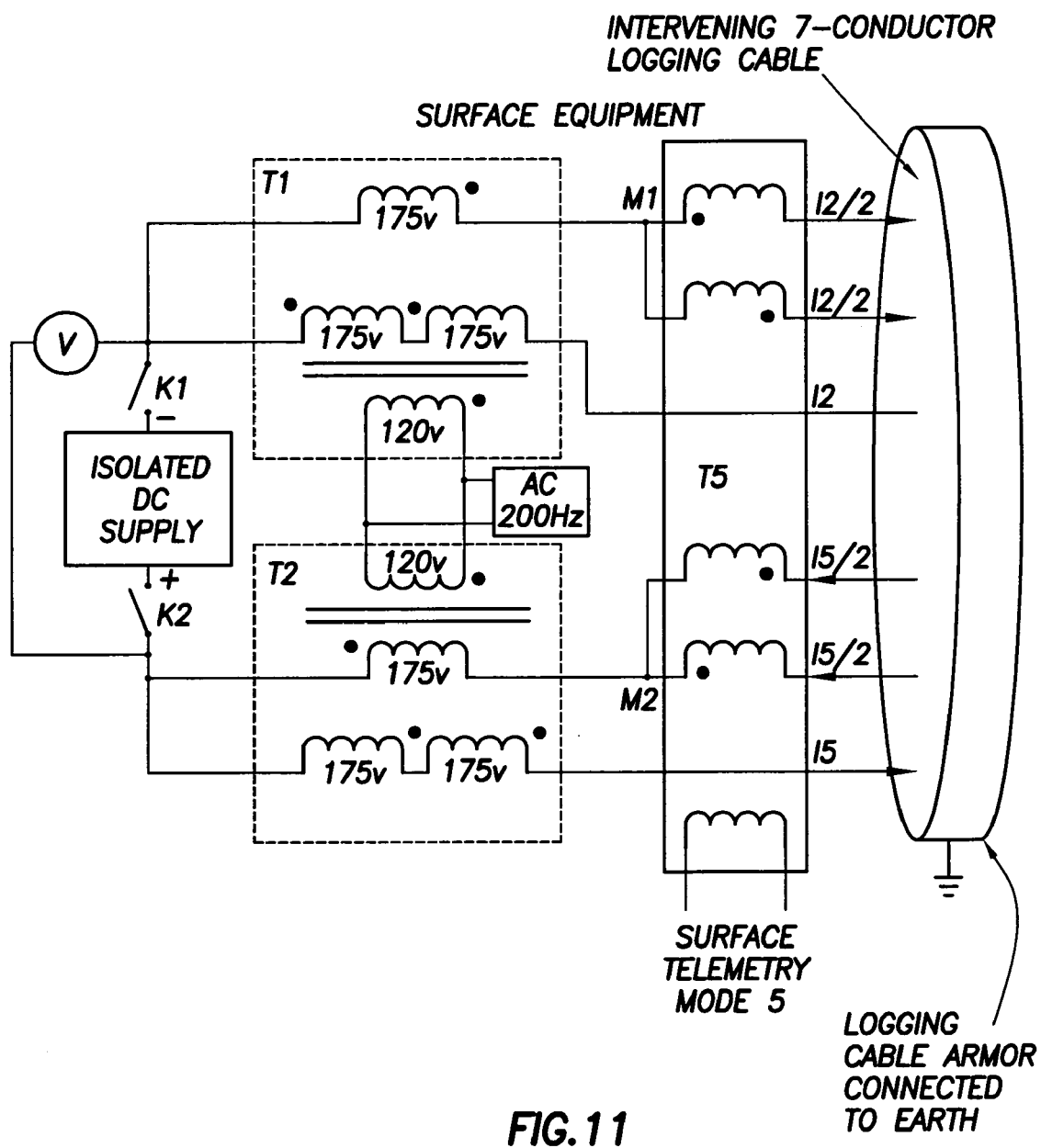
FIG. 11 is a second scheme for implementing detection of tool top voltage.

Referring now to FIG. 11, an alternate circuit to determine top of tool voltage is shown. The surface DC supply 500 has been disconnected from the auxiliary connection to the wireline. using relays K1 and K2. As the downhole instrument voltage is increased from 0 towards 200 VDC, it can be read at the surface with the same meter that is used to measure Aux voltage during operation. That downhole instrument bus is connected to the downhole Aux bus through two 0.5 Megohm resistors. These resistors isolate the two buses during normal operations. The surface reading of the downhole instrument bus voltage is a slow acting because the downhole voltage source is connected through two each 0.5 megohm resistors and the 1.5 uf cable capacitance, but this slow reaction time is not a problem during setup.

To determine the downhole instrument voltage by measuring the uphole auxiliary voltage connection to downhole, we note that the downhole instrument bus voltage causes current to flow through 584, 580 through the wireline combination of conductors #1, #3, #5 in parallel, at the surface through 542, 540, 542A, 540A and 542B, 540B. The current returns to the negative downhole instrument bus by flowing through 540E, 542E, 540D, 542D, and 540C, 542C, through wirelines #2, #4, and #6 through 582 and 586 back to the negative instrument bus. The voltage current in this path is then:

$$I = V_{INSTRUMENT\ BU}/2(0.5\ Meg+(300\Omega+300+300)/3+51.1\ k)$$

$$I = V_{INSTR\ DH}/(20M+1\ Meg+100.2\ k+200\Omega)$$

$$I \approx V_{INSTR\ DH}/21,000,000$$

Surface Voltage across #1, #3, #5 is the same.

$$V=IR=V_{INSTR\ DH}/21,000,000 \times (10M+51.1\ k) \approx 0.477\ V_{DH}$$

Surface Voltage across #2, #4, #6

$$V=IR=-V_{INSTR\ DH}/21,000,000 \times (10M+51.1\ k) \approx -0.477\ V_{DH}$$

Aux measurement is $V_{AUX}=V_{1,3,5\ AVG}-V_{2,4,6\ AVG}=0.957\ V_{DH INSTR\ BUS}$ Once the correct instrument voltage is attained, K1 and K2 are closed and the DC supply is reconnected to the surface Aux direct cable connections and the system is ready to operate.

Shown in FIG. 5A is an isolated DC supply furnishing auxiliary power to via cable mode 6(1). This source can be either DC or AC. If it is an AC source then in order to get as high a voltage as possible on each mode of power transmission and still not exceed the voltage rating of the logging cable, one or more of the power sources supplying power simultaneously to the cable may be shifted in phase with respect to the high power supply. Thus the peak voltages of different power sources no longer occur simultaneously. In this manner phase shifting of one source with respect to another allows the highest possible voltages to be run on each power mode.

Computer control may be used to optimize performance of the system. Computer 30 can be programmed with the toolstring configuration, and can be configured to determine the communications protocols and resulting power requirements of each mode. The computer may further customize waveforms and phase shifts of the individual power sources to maximize the power capacity of the cable 20. The individual power sources may be switching power supplies with programmable amplitudes, phase shifts, and waveforms that the computer can control. The power sources 32 may be provided with RS232 ports for bi-directional communication with computer 30. In a preferred embodiment, the computer 30 analyzes uplink telemetry to determine power voltages downhole and automatically adjusts the power supply parameters to stabilize the downhole power voltages.

For increased versatility, time division multiplexing may also be used on the modes. Motors which do not need to be run simultaneously can trade off ownership of a power mode. For example, logging tools run in a stationary position can switch off and allow other tools to run as the tool goes up or down the borehole. A second example is a tool string containing several pads in different locations in the string which must be pressed against the side of the bore hole to make a short range measurement. These individual pads can be motored out or in as necessary to attain a particular measurement. The switching may be controlled via commands transmitted with the downlink telemetry. The computer can be configured to handle this control function.

The configuration depicted in FIGS. 5A and 5B also takes advantage of the parasitic resistance provided by the wireline to ballast the DC currents applied to the primary windings of T3 and T4, and the secondary windings of T1 and T2. As a result, the flux density imbalance in the transformers is relatively small while supplying relatively large DC currents to the downhole tools. In this context, the term relatively small means the flux density capability of the transformer itself is not likely to exceed 10 percent, and more preferably will not exceed on the order of 4 to 5 percent depending on the quality of the wireline, and connections in the system. This relatively small flux intensity guards against flux saturation of the transformer core.

An aspect of the system of FIGS. 5A and 5B is a 1:2 turns ratio and proper phasing of the transformer windings connected to the wireline. Referring to FIG. 5A, the DC current supply forces a given amount of current, referred to as $I_{DC}$, along each of the conductor cables 1, 3, and 5 in the one direction and 2, 4, and 6 in the other. Because conductor cables 4 and 6 connect between transformer T1 and T5, it follows that 2 $I_{DC}$ (two times $I_{DC}$) flows through transformer winding 521 while $I_{DC}$ flows through windings 522 and 523. However, because windings 522 and 523, combined, have twice the number of turns as winding 521 in the opposite direction, the imbalance cancels out. Similarly, conductor cables 1 and 3 connect between transformer T2 and T5, meaning that 2 $I_{DC}$ flows through transformer winding 524 while $I_{DC}$ flows through windings 525 and 526, but the imbalance cancels out by twice as many turns in windings 525 and 526 as in winding 524. Such DC current balancing allows a much greater amount of DC current to flow along the conductor cables.

Transformer size, cost, and efficiency are improved by using this method. Harmonic generation, reduced AC flux density capacity, disrupted communications, and other corresponding adverse effects are prevented.

While preferred embodiments of this invention have been shown and described, modifications thereof can be made by one skilled in the art without departing from the spirit or teaching of this invention. The invention as described includes various aspects, each of which may be separately patentable. Thus, the embodiment described herein is exemplary only and is not limiting. Many variations and modifications of the system and apparatus are possible and are within the scope of the invention. In addition to the variants discussed above, voltage supply 500 could may be either AC or DC. Designers are not limited to using modes when transmitting signals downhole. The system could be built without one of the auxiliary or instrument power supplies, or without the telemetry transformers. Different voltages or resistance values could be used. Aspects or features of the invention could be used alone or in combinations other than that described in the exemplary embodiments above. Accordingly, the scope of protection is not limited to the embodiment and its variants as described herein, but is only limited by the claims which follow, the scope of which shall include all equivalents of the subject matter of the claims.

What is claimed is:

1. A power delivery system for a wireline tool, comprising:
   a power source;
   a first transmission loop to provide electrical power to said wireline tool, said first transmission loop having a first surface transformer coupled to said power source;
   a second transmission loop to provide electrical power to said wireline tool, said second transmission loop having a second surface transformer coupled to said power source; and
   at least one power converter coupled to said first and second transmission loops at a location different from said power source, said power converter suitable to deliver electrical power from said first transmission loop and said second transmission loop to said wireline tool;
   wherein said first transmission loop is a closed current path and said second transmission loop is a closed current path, said first and second transmission loops being independent such that said first transmission loop is capable of power delivery regardless whether said second transmission loop is capable of power delivery.

2. The power delivery system of claim 1, further comprising:
   a third transformer as part of said first transmission loop;
   a fourth transformer as part of said second transmission loop;
   wherein said power converter couples to said third and fourth transformers.

3. The power delivery system of claim 1, further comprising:
   a second power source coupled between said first and second surface transformers.

4. The power delivery system of claim 1, further comprising:
   a second power source coupled between said first and second surface transformers, wherein said power source provides alternating current and said second power source provides direct current.

5. The power delivery system of claim 1, wherein said first transmission loop and second transmission loop include six conductors, said first transmission loop comprising first, third, and fifth conductors and said second transmission loop comprising second, fourth, and sixth conductors.

6. The power delivery system of claim 1, wherein a first terminal of said power source couples directly by attachment to said first surface transformer and a second terminal of said power source couples directly by attachment to said second surface transformer.

7. The power delivery system of claim 1, wherein said power source magnetically couples to said first and second surface transformers.

8. The power delivery system of claim 1, further comprising:
   a telemetry transformer having first and second pairs of windings, said first pair of windings being connected in series for purposes of telemetry communication and said second pair of windings being connected in series for purposes of telemetry communication, there being an absence of shorting capacitors between said first pair of windings and an absence of shorting capacitors between said second pair of windings.

9. The power delivery system of claim 1, further comprising:
   a second power source magnetically coupled between said first and second surface transformers,
   wherein a first terminal of said power source couples directly by attachment to said first surface transformer and a second terminal of said power source couples directly by attachment to said second surface transformer.

10. The power delivery system of claim 1, further comprising:
    a circuit to detect a first voltage on said first transmission loop and a second voltage on said second transmission loop;

a comparator to compare said first voltage and said second voltage.

11. The power delivery system of claim 1, wherein said first surface transformer and said second surface transformer are identical in construction.

12. The power delivery system of claim 1, wherein said first surface transformer includes first and second windings in series.

13. The power delivery system of claim 1, further comprising:
a third transformer coupled to said first transmission loop and to said second transmission loop;
a fourth transformer coupled to said first transmission loop and to said second transmission loop;
said third transformer suitable to deliver a data signal to said fourth transformer along at least one of said first and second transmission loops.

14. The power delivery system of claim 1, further comprising:
a third transformer coupled to said first transmission loop, said third transformer suitable to draw power off said first transmission loop;
a fourth transformer coupled to said second transmission loop, said fourth transformer suitable to draw power off said second transmission loop;
a fifth transformer coupled to said first transmission loop and to said second transmission loop;
a sixth transformer coupled to said first transmission loop and to said second transmission loop;
said fifth transformer suitable to deliver a data signal to said sixth transformer along at least one of said first and second transmission loops.

15. The power delivery system of claim 14, wherein said first and second surface transformers are at a surface location and said third and fourth transformers are at a downhole location.

16. The power delivery system of claim 1, further comprising:
a third transformer coupled to said first transmission loop and to said second transmission loop, said third transformer including a first winding connected in series with a second winding without an intervening winding and a third winding connected in series with a fourth winding without an intervening winding;
a fourth transformer coupled to said first transmission loop and to said second transmission loop;
said third transformer suitable to delivery a data signal to said fourth transformer along one or more of said first and second transmission loops.

17. The power delivery system of claim 16, wherein said fourth transformer is suitable to deliver a data signal to said third transformer along the same one or more transmission loops used by said third transformer.

18. The power delivery system of claim 16, said fourth transformer further comprising a fifth winding connected in series for purposes of data transmission with a sixth winding without an intervening winding and a seventh winding connected in series for purposes of data transmission with an eighth winding without an intervening winding, wherein said fourth transformer is suitable to deliver a data signal to said third transformer.

19. The power delivery system of claim 1, further comprising:
a second power source magnetically coupled between said first and second surface transformers;
a third transformer coupled to said first transmission loop and to said second transmission loop; and
a fourth transformer coupled to said first transmission loop and to said second transmission loop;
wherein said third transformer is suitable to deliver a data signal to said fourth transformer along at least one of said first and second transmission loops, and wherein a first terminal of said power source couples directly by attachment to said first surface transformer and a second terminal of said power source couples directly by attachment to said second surface transformer.

20. The power delivery system of claim 18, wherein said first transmission loop and second transmission loop consist of six conductors, said first transmission loop consisting of first, third, and fifth conductors and said second transmission loop consists of second, fourth, and sixth conductors.

21. The power delivery system of claim 18, wherein a first terminal of said power source attaches directly to a winding of said first surface transformer and a second terminal of said power source attaches directly to a winding in said second surface transformer.

22. The power delivery system of claim 1, wherein said first and second surface transformers each include at least three windings in series.

23. The power delivery system of claim 1, further comprising:
a second power supply connected between said first transmission loop and said second transmission loop;
a third transformer with primary and secondary windings;
a fourth transformer with primary and secondary windings;
at least one connection between said primary windings of said third and fourth transformers and said secondary windings of said third and fourth transformers.

24. The power delivery system of claim 1, further comprising:
a second power source magnetically coupled between said first and second surface transformers;
a third transformer coupled to said first transmission loop and to said second transmission loop; and
a fourth transformer coupled to said first transmission loop and to said second transmission loop;
wherein said third transformer is suitable to deliver a first data signal to said fourth transformer along at least one of said first and second transmission loops and said fourth transformer is suitable to deliver a second data signal to said third transformer along said at least one of said first and second transmission loops, and wherein a first terminal of said power source couples directly by attachment to said first surface transformer and a second terminal of said power source couples directly by attachment to said second surface transformer.

25. A communication system, comprising:
a telemetry transformer having a first winding, a second winding, a third winding, and a fourth winding;
a power supply coupled to said telemetry transformer;
a first power transformer; and
a second power transformer;
wherein said first winding connects in series with said second winding without an intervening winding magnetically coupled to said power supply between said first and second windings, and said third winding connects in series with said fourth winding without an intervening winding magnetically coupled to said power supply between said third and fourth windings;
wherein said power supply couples magnetically to said first power transformer and said second power transformer.

26. A method to deliver power via a cable having at least six conductors, comprising:
   placing a first potential across a first transformer, said first transformer magnetically coupled to a power source and connected to a first three of said six conductors;
   placing a second potential across a second transformer, said second transformer magnetically coupled to the power source and connected to a second three of said six conductors; and
   providing a third potential between said first three of said six conductors and said second three of said six conductors;
   wherein the step of placing said first and second potential are where said first and second potential are the same magnitude.

27. The method of claim 26, wherein said third potential is generated by a DC power supply.

28. The method of claim 26, further comprising:
   comparing said a potential on said first three of said conductors with a potential on said second three of said conductors to determine if there exists an electrical leak.

29. A method to detect top of tool voltage for a wireline tool downhole in a borehole, comprising:
   a) applying instrument supply voltage uphole;
   b) increasing instrument supply voltage;
   c) monitoring auxiliary surface voltage; and
   d) stabilizing instrument supply voltage upon reaching desired auxiliary surface voltage.

30. The method of claim 29, wherein power lines corresponding to an auxiliary power supply and said instrument supply voltage are connected at a downhole location.

31. The method of claim 29, wherein power lines corresponding to an auxiliary power supply and said instrument supply voltage are connected by a set of resistors at a downhole location.

32. The method of claim 29, further comprising applying said auxiliary power after stabilizing said instrument supply voltage.

33. The method of claim 29, further comprising disconnecting auxiliary power prior to the step of increasing said instrument supply voltage.

34. The power delivery system of claim 1, wherein said first transmission loop includes a transformer having a first winding ratio and said second transmission loop includes another transformer having a second winding ratio, said first and second winding ratios being the same and resulting in a balanced DC flux intensity.

35. The power delivery system of claim 34, wherein said first and second ratios are 1:2.

36. The power delivery system of claim 1, wherein a flux density imbalance in a transformer of the first transmission loop and a different transformer of the second transmission loop is relatively small.

* * * * *